(12) United States Patent
Okuno et al.

(10) Patent No.: US 6,355,906 B1
(45) Date of Patent: Mar. 12, 2002

(54) PRODUCTION SYSTEM USING COMBINATION JIGS AND JIG REPLACEMENT METHOD AND APPARATUS THEREFOR

(75) Inventors: Mitsuro Okuno; Hiromi Suzuki, both of Kanagawa-ken (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 0 days.

(21) Appl. No.: 09/348,582

(22) Filed: Jul. 7, 1999

(30) Foreign Application Priority Data

Jul. 7, 1998 (JP) .............................. 10-192093

(51) Int. Cl.$^7$ .............................................. B23K 26/00
(52) U.S. Cl. .............................. 219/121.63; 219/121.6; 219/121.64; 219/121.67
(58) Field of Search .................... 219/121.63, 121.6, 219/121.64, 121.67, 121.76, 121.78, 121.79, 121.8, 121.81, 121.82, 121.83

(56) References Cited

U.S. PATENT DOCUMENTS

| | | | |
|---|---|---|---|
| 3,915,442 A | * 10/1975 | Marantette et al. | 269/71 |
| 5,023,427 A | * 6/1991 | Neiheisel et al. | 219/121.82 |
| 5,045,668 A | * 9/1991 | Neiheisel et al. | 219/121.83 |
| 5,925,268 A | * 7/1999 | Britnell | 219/121.63 |

* cited by examiner

Primary Examiner—M. Alexandra Elve
(74) Attorney, Agent, or Firm—McDermott, Will & Emery

(57) ABSTRACT

A combination of a lower jig (77) set on a stationary base (79) and an upper jig (75) adapted to cooperate with the lower jig to pinch a work (W), hold the work and move along a guide rail (111) between from a work loading section (69) and a laser welding section (71) is replaced by a loader (113) movable on the guide rail, an upper jig clamp (115) provided on the loader and having a jig receiver (119) for a side edge (125) of the upper jig to be placed thereon and a vertically movable member (123) to be moved downward from above the jig receiver to clamp the side edge of the upper jig, an upper jig lift (103) adapted, when the upper jig is released from the upper jig clamp as the vertically movable member is moved upward, to lift the upper jig to render the loader movable together with the upper jig clamp to the work loading section, a jig transfer guide rail (94) normally downwardly spaced from the lower jig and adapted, when the loader is moved together with the upper jig clamp to the work loading section and the upper jig is placed on the lower jig as the upper jig is downwardly moved by the upper jig lift, to guide the upper and lower jigs to be moved in a perpendicular direction to the guide rail, a rail lift (93) adapted to lift the jig transfer guide rail to support the lower jig, as the upper jig is placed thereon, and a guide rail lift (149) adapted to move the guide rail to have a movement range secured for the lower jig to be moved together with the upper jig along the jig transfer guide rail, as the jig transfer guide rail is lifted by the rail lift, for one of loading and unloading of the upper and lower jigs relative to outside.

18 Claims, 15 Drawing Sheets

FIG.1

PRODUCTION SYSTEM USING COMBINATION JIGS AND JIG REPLACEMENT METHOD AND APPARATUS THEREFOR

BACKGROUND OF THE INVENTION

The present invention relates to a production system using a plurality of different combination jigs and a jig replacement method and a jig replacement apparatus therefore. More specifically, the invention relates to a production system equipped with a production line, preferably a laser welding line, including a line section using a combination jig and having a gateway extending therealong, and to a jig replacement method and a jig replacement apparatus therefore.

A laser welding line for production of an automobile body includes a number of line sections each dedicated for butt welding pieces of a work along a particular weld line, such as between sheet pieces of a door outer panel different of antecedent process or treatment or in configuration or thickness, as necessary for cost-effective production of a weight-reduced product, and a respective line section employs a dedicated one of different combination jigs for work pieces to be thereby held so as to abut on each other to be butt welded along a corresponding weld line.

SUMMARY OF THE INVENTION

Such a combination jig may preferably be selected for and replaced from time to time at a common line section for butt welding.

In this respect, a respective combination jig comprises a pair of upper and lower jigs. The lower jig is installed on a base. The upper jig is adapted for handling work pieces to be loaded on the lower jig, and cooperates with the lower jig to pinch the work pieces therebetween, under assistance of a gateway that extends along the line section and supports and longitudinally carries the upper jig.

The upper and lower jigs are both great and heavy, e.g. several tons of weight, and need a mechanical transfer to and from the line section which has a two-dimensional density of auxiliary equipment installed therearound, such as a laser head handling framework standing astride the gateway.

The gateway may preferably serve for carrying both upper and lower jigs to longitudinally load them in a work region.

However, such a gateway has cross members with suspended appliances, such as utility lines and a work unloader, which may impede a longitudinal transfer of the jigs, constituting an obstacle to efficient production.

The present invention has been achieved with such points in view.

It therefore is an object of the invention to provide a production system using a plurality of different combination jigs, as well as a jig replacement method and a jig replacement apparatus therefore, permitting smooth jig replacement, allowing efficient production.

To achieve the object described, an aspect of the invention provides a production system comprising an elongate work region for an arbitrary one of different combination jigs to be handled therein to thereby hold a work to be processed, preferably for a laser processing (in particular for a butt welding), a gateway extending astride the work region and adapted to longitudinally carry an upper jig portion of the arbitrary combination jig, and a rail line to guide the arbitrary combination jig into and out of the work region transversely of the gateway.

Further, to achieve the object, another aspect of the invention provides a jig replacement method for a production system including an elongate work region for an arbitrary one of different combination jigs to be handled therein to thereby hold a work to be processed, preferably for a laser processing (in particular for a butt welding), and a gateway extending astride the work region and adapted to longitudinally carry an upper jig portion of the arbitrary combination jig, the jig replacement method comprising guiding the arbitrary combination jig into the work region transversely of the gateway, and guiding the arbitrary combination jig out of the work region transversely of the gateway.

Another aspect of the invention provides a jig replacement method for replacing a lower jig set on a base, and an upper jig adapted to cooperate with the lower jig for pinching to secure therebetween a work to be subjected to a processing, hold the work and move along a guide rail between from a work loading position, where the work is carried in from outside, to a work position for the processing, the jig replacement method comprising the steps of upwardly moving the upper jig to be free from an upper jig clamp, as the upper jig is released from the clamp at a side edge thereof, moving the upper jig clamp to the work loading position, downwardly moving the upper jig to be placed on the lower jig, upwardly moving a jig transfer guide rail extending in a perpendicular direction to the guide rail, supporting the lower jig by the jig transfer guide rail together with the upper jig, moving the guide rail to a position out of a movement range for the jigs to be carried along the jig transfer guide rail, and carrying the jigs outside along the jig transfer guide rail.

Further, to achieve the object, another aspect of the invention provides a jig replacement apparatus for replacing a lower jig set on a base, and an upper jig adapted to cooperate with the lower jig for pinching to secure therebetween a work to be subjected to a processing, hold the work and move along a guide rail between from a work loading position, where the work is carried in from outside, to a work position for the processing, the jig replacement apparatus comprising a loader movable on the guide rail, an upper jig clamp provided on the loader and having a jig receiver for a side edge of the upper jig to be placed thereon and a vertically movable member to be moved downward from above the jig receiver to clamp therebetween the side edge of the upper jig, an upper jig lift adapted, when the upper jig is released from the upper jig clamp as the vertically movable member is moved upward, to lift the upper jig to render the loader movable together with the upper jig clamp to the work loading position, a jig transfer guide rail normally downwardly spaced from the lower jig and adapted, when the loader is moved together with the upper jig clamp to the work loading position and the upper jig is placed on the lower jig as the upper jig is downwardly moved by the upper jig lift, to guide the upper and lower jigs to be moved in a perpendicular direction to the guide rail, a rail lift adapted to lift the jig transfer guide rail to support the lower jig, as the upper jig is placed thereon, and a guide rail lift adapted to move the guide rail to have a movement range secured for the lower jig to be moved together with the upper jig along the jig transfer guide rail, as the jig transfer guide rail is lifted by the rail lift, for one of loading and unloading of the upper and lower jigs relative to outside.

BRIEF DESCRIPTION OF THE ACCOMPANYING DRAWINGS

The above and further objects and novel features of the present invention will more fully appear from the following detailed description when the same is read in conjunction with the accompanying drawings, in which:

FIG. 1 is a perspective view, partly in section, of a butt welding line section of a laser welding line as a production line of a production system according to an embodiment of the invention;

DETAILED DESCRIPTION OF THE PREFERRED EMBODIMENTS

Figure 18:
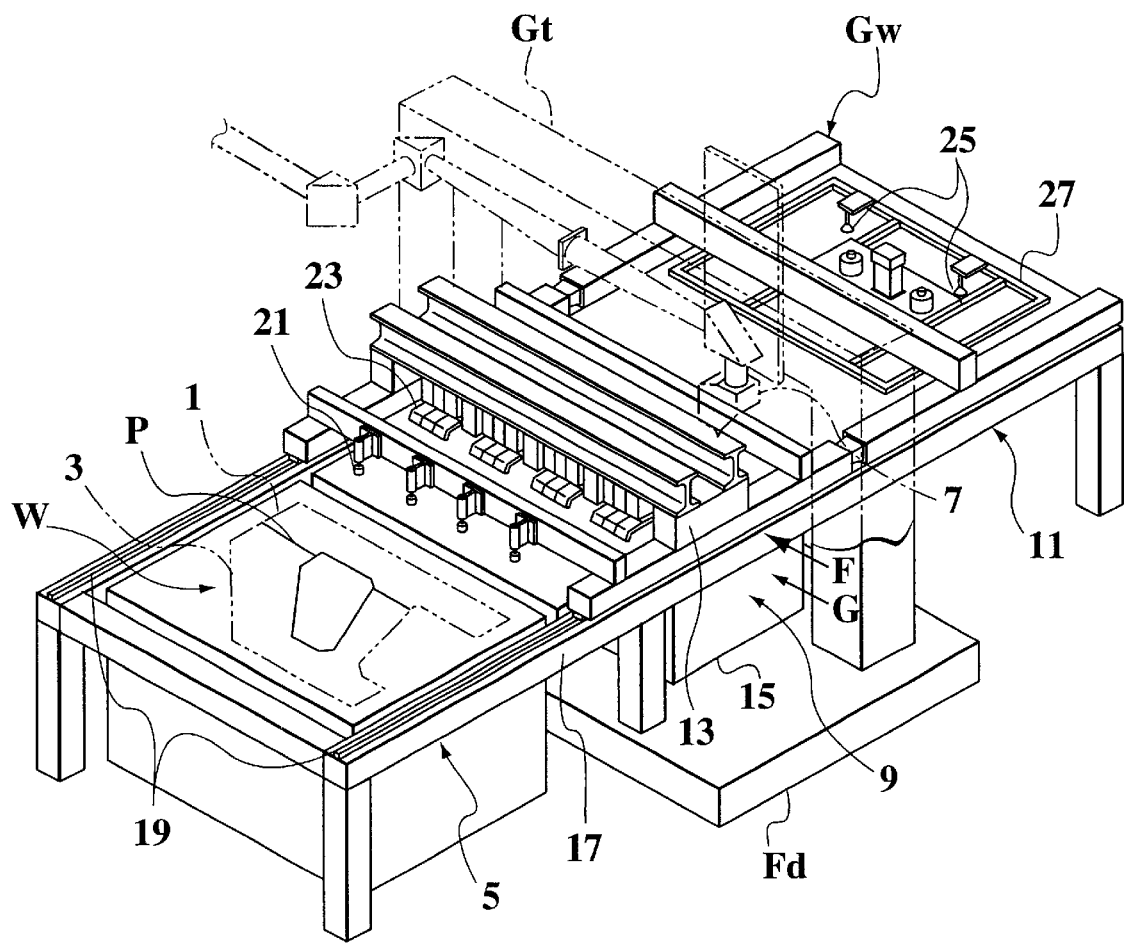
FIG. 18 is an illustration of a prototype of laser welding line using a prototype of combination jig.

First, with reference to FIGS. 18 to 20, there will be described for comprehension some functions and actions of a prototype of combination jig to be used at a continuously gated prototype of butt welding line section of a laser welding line, where an outer panel of an automobile door (as a work W) is processed by butt welding an expensive anticorrosive lower panel 1 and an inexpensive non-anticorrosive upper panel 3 to each other along weld lines P set in position. The butt welding may be for punch-pressed pieces to be joined for an increased yield, or between sheet plates different in thickness.

The line section has a gated work loading or carrying-in section 5, a gated laser welding section 9 employing a laser head 7 for the butt welding, a gated work unloading or carrying-out section 11, and a laser gate Gt standing astride the laser welding section 9 for handling the laser head 7.

The laser welding section 9 uses a combination jig to set the work W in position for a desired welding. The combination jig is provided as a combination of an upper jig 13 and a lower jig 15 cooperative with each other to hold the work W therebetween. The lower jig 15 is fixed at an adjusted position on a raised foundation Fd. The upper jig 13 is movable between the loading and unloading sections 5 and 11, as it is guided along a pair of stationary guide rails 19 that constitute part of a continuous gateway Gw.

The upper jig 13 has front and rear arrays of work attracting magnets 21, whereby the work W is carried, as the jig 13 is moved, from the loading section 5 to the laser welding section 9, where it rests on the lower jig 15, to be set in position. The upper jig 13 has front and rear arrays of clamp pawls 23, which then come down to clamp the work W against the lower jig 15, at vicinal points to weld lines P.

After necessary welding, the upper jig 13 is guided forward together with a work holder 27 linked thereto and integrally guided. The work holder 27 is movable between the laser welding section 9, where its vacuum cups 25 catch up the welded work W, and the unloading section 11, where they release it. The catch-up of the welded work W by the vacuum cups 25 may match in timing with attraction of a subsequent work W by the magnets 21.

The upper and lower jigs 13 and 15 have their work positioning mechanisms, which are each constituted with a clamp pusher unit 29 and a work clamp unit 31 for the upper jig 13, and with a clamp pusher unit 33, a reference pin unit 35, and work clamping center and side blocks 37 and 39 for the lower jig 15.

The clamp pusher unit 29 has a press piece 43 vertically movable by operation of a fluid cylinder 41. A piston rod 45 of the cylinder 41 is driven to go down, actuating the press piece 43 to press the work W on the lower jig 15, so that the work W is fixed onto a work receiver 47 of the clamp pusher unit 33. The cylinder 41 is adapted, by a linear guide 49 at the top, to move sideways relative to a body frame 51 of the upper jig 13.

The work clamp unit 31 has clamp pawls 23 to be driven with a fluid cylinder 53 fixed at its upper end to the body frame 51. As a piston rod 55 of the cylinder 53 comes down, each clamp pawl 23 presses the work W to be fixed with the center and side blocks 37 and 39 of the lower jig 15. Each clamp pawl 23 has extended portions at both sides of the piston rod 55, and pinching parts 23a at their distal ends contact on the work W.

Figure 19:
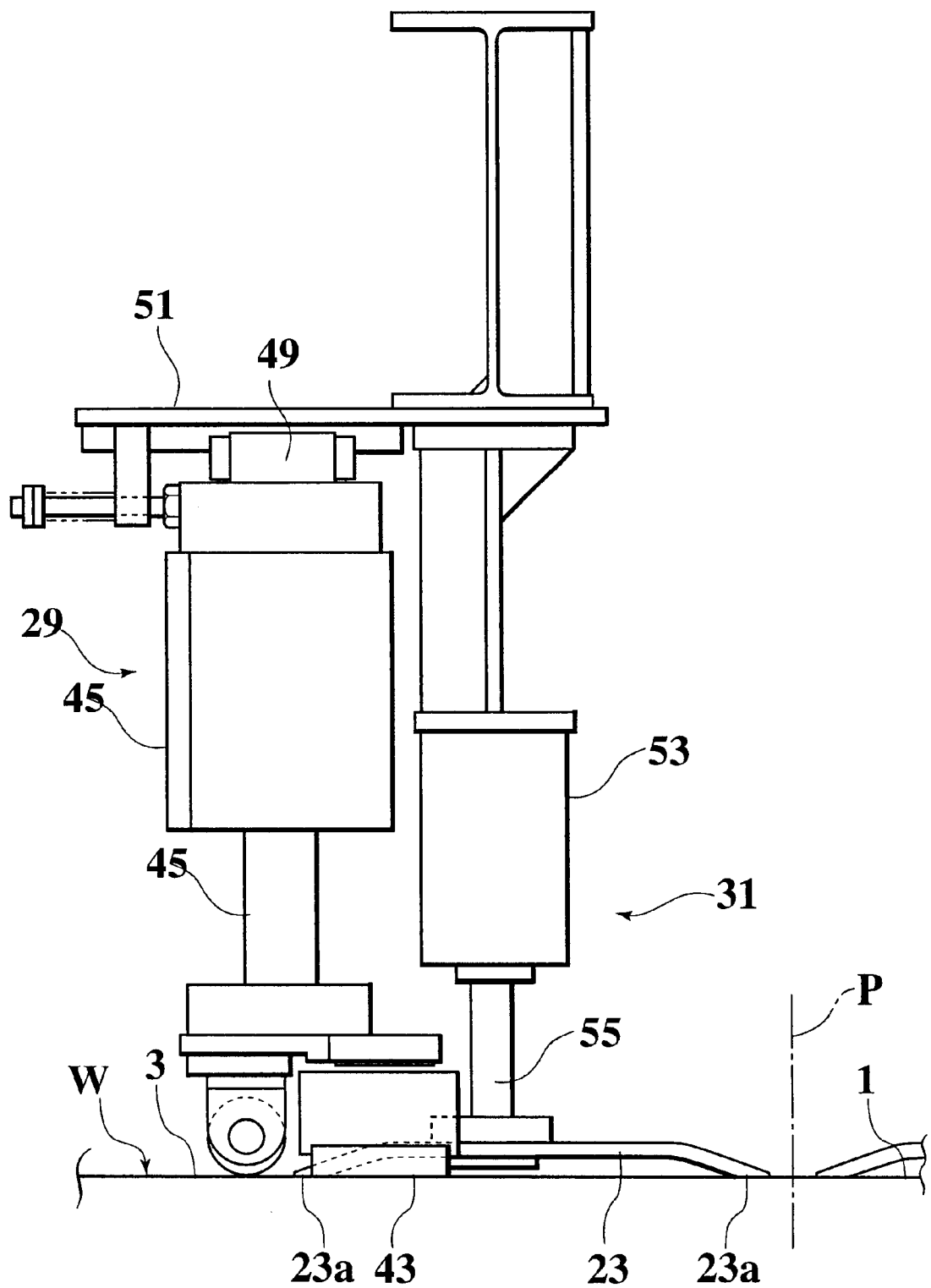
FIG. 19 is a detailed front view of an upper jig of the combination jig, in a direction of arrow F of FIG. 17.
Figure 20:
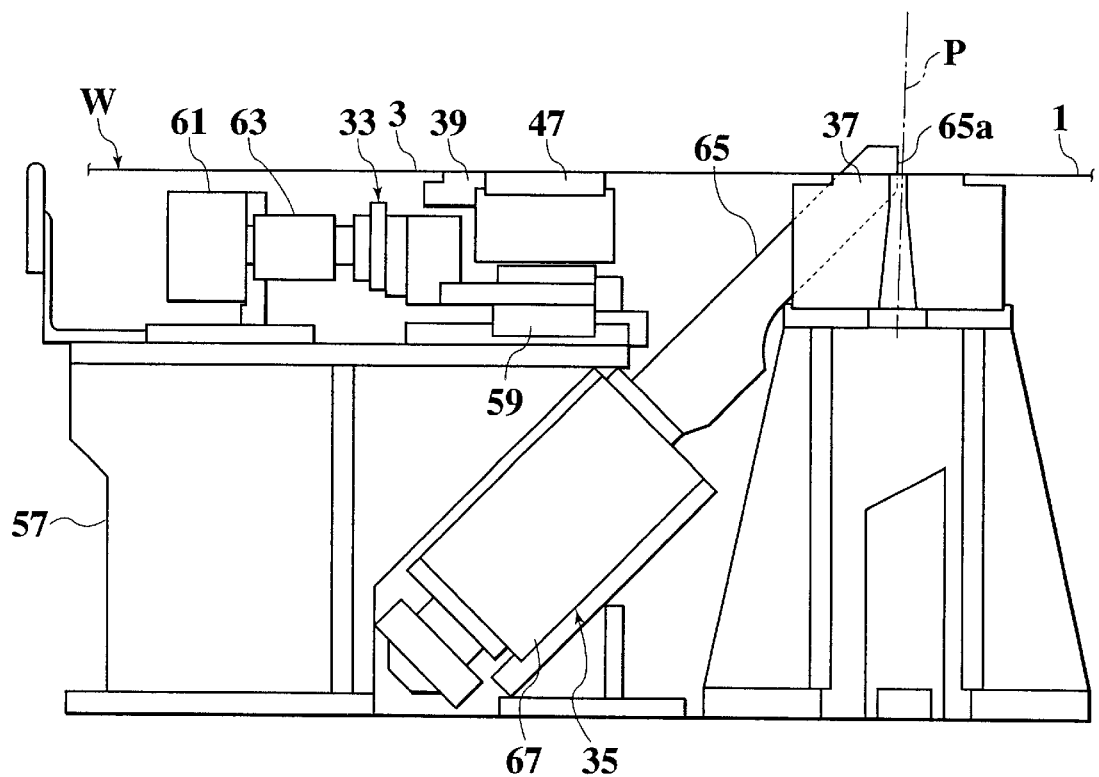
FIG. 20 is a detailed front view of a lower jig of the combination jig, in a direction of arrow G of FIG. 17.

For the upper jig 13, a pair of such positioning mechanisms are provided symmetrical about the weld lines P: a left one for the upper panel 3 of the work W, as in FIG. 19, and a right one for the lower panel 1.

The clamp pusher unit 33 has the work receiver 47 which is adapted, by a linear guide 59, to move sideways relative to a body frame 57 of the lower jig 15. At a left side of the work receiver 47, the body frame 57 has mounted thereon a fluid cylinder 61, of which a piston rod 63 is actuated to left and right to move the work receiver 47.

Also center and side blocks 37 and 39 fixed to the body frame 57 are arranged to be symmetrical about the weld lines P, as well as clamp pusher units 33.

Reference pin units 35 are arrayed along the weld-lines P, simply at the left side. Each reference pin unit 35 is inclined to the right and has a reference pin 65 driven, by a fluid cylinder 67 fixed to the body frame 57, to move between a depicted advanced position over the work W and a retreat position under the work W. In the advanced position, the pin 65 coincides with a weld line P, at an end face 65a thereof that abuts on an end face of the lower panel 1 to be butt welded.

For the butt welding, the left and right clamp pusher units 29 of the upper jig 13 are operated to fix the lower panel 1 and the upper panel 3 between the press pieces 43 and the work receivers 47, in their first positions where their end faces to be welded are spaced from the weld line P to avoid interference with the reference pin 65 in the advanced position.

The clamp pusher unit 33 at the right end is then operated to move the lower panel 1 toward the upper panel 3 until the end face 65a of the reference pin 65 in the advanced position abuts on an end face of the lower panel 1 to be thereby positioned, when the work clamp unit 31 at the right end is operated to have the clamp pawl 23 press the lower panel 1 to be fixed on the center and side blocks 37 and 39.

Then, the reference pin 65 retreats to the retreat position, and the clamp pusher unit 33 at the left end is operated to move the upper panel 3 toward the lower panel 1 until an end face of the former abuts on that of the latter, when the work clamp unit 31 at the left end is operated to have the clamp pawl 23 press the upper panel 3 to be fixed on the center and side blocks 37 and 39.

Like this, the combination jig (13, 15) is dedicated to a combination of location, configuration and dimensions of a particular butt weld line (P) or butt weld lines (P, P).

A laser welding line equipped to cope with a variety of weld lines thus has a corresponding variety of such dedicated combination jigs to be each selective for a particular welding process and adaptive to be handled for associated replacement.

It should be noted that the work attracting and positioning functions (21, 23) described as well as associated mechanisms (29, 31, 33, 35) and structures will be succeeded, as necessary, in a variety of combination jigs (J; 75, 77) in the following embodiments, in which combination jigs are defined to be different or diversified at least by a different setting of center and/or side blocks 37, 39 (see FIG. 4).

There will be detailed below preferred embodiments of the present invention with reference to the accompanying drawings. Like members are designated by like reference characters.

Figure 17:
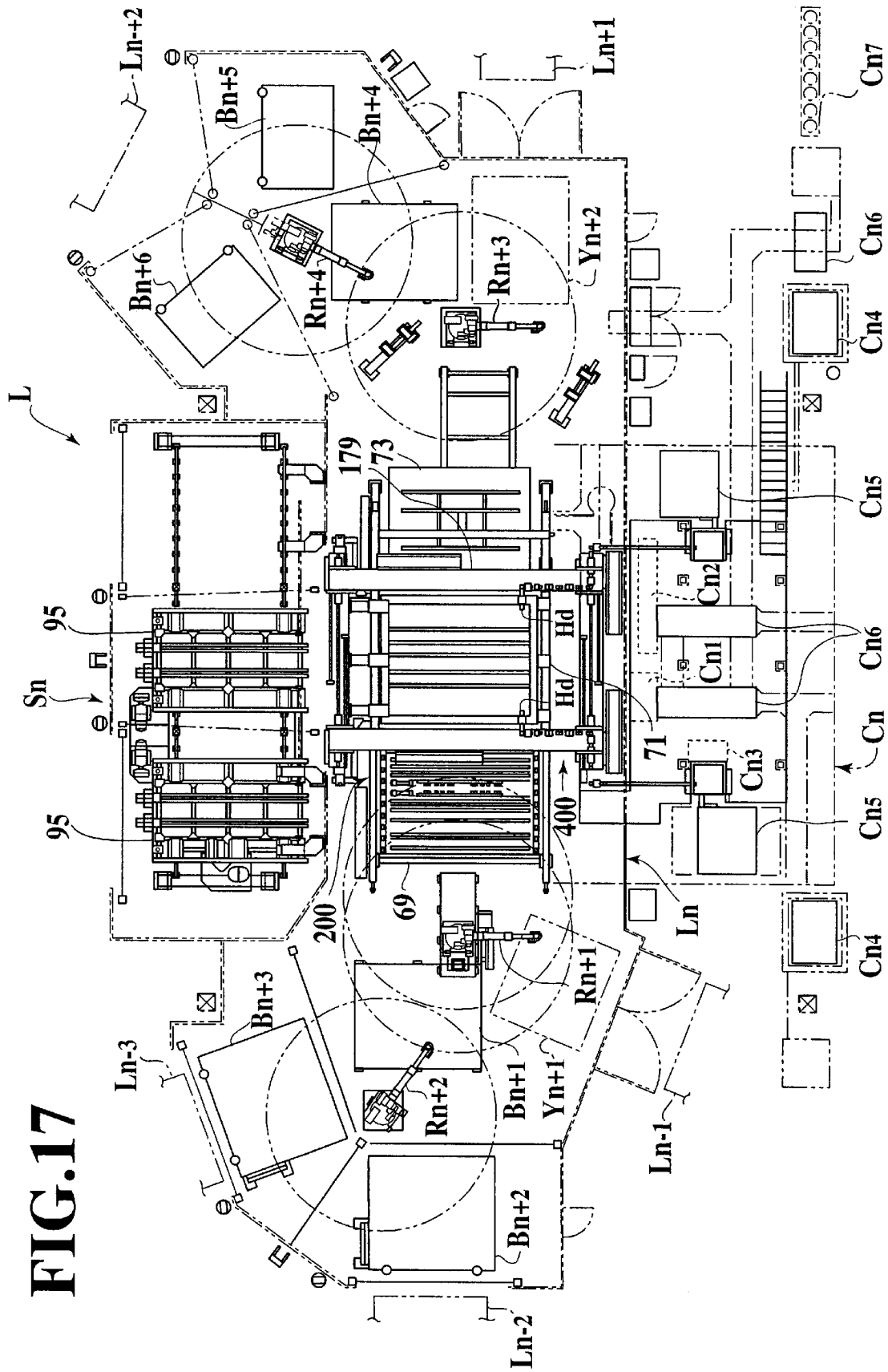
FIG. 17 is a plan of the laser welding line of FIG. 1.

FIG. 17 shows in schematic plan an air-conditioned and beam-shielded outer panel butt-welding line section L, of a laser welding line L as a door production line of an automobile production system according to an embodiment of the invention.

The laser welding line L comprises a total of N production lines $L_i$(i=1, . . . , n–1, n, n+1, . . . , N) parallel-serially interconnected via conveyor line extensions, forwarding or hooking yards $Y_{i+j}$ or benches $B_{i+j}$ and/or work handling robots $R_{i+j}$ e.g. the outer panel butt-welding line section $L_n$ is connected at a work loading section 69 thereof via arm robots $R_{n+1}, R_{n+2}$ and a yard $Y_{n+1}$ or benches $B_{n+1}, B_{n+2}, B_{n+3}$, to antecedent three parallel line sections $L_{n-1}, L_{n-2}, L_{n-3}$ and at a work unloading section 73 thereof via arm robots $R_{n+3}, R_{n+4}$, and a yard $Y_{n+2}$ or benches $B_{n+4}, B_{n+5}, B_{n+6}$ to subsequent two parallel line sections $L_{n+1}, L_{n+2}$. Butt welding processes may be collected at the line section $L_n$, allowing for the antecedent and/or subsequent parallel line sections to be implemented for other welding processes.

The butt welding line section $L_n$ includes the work loading section 69, a laser welding section 71, the work unloading section 73, a number of processing heads Hd as laser heads to be individually carried in position by means of a multi-axis feed system 400 implemented in a form of a 2D (two-dimensional) overhead frame 179 slidably supported on front and rear gates (151+156 in FIG. 1) thus standing astride a gateway 200, a combination jig supply station $S_n$ using a pair of jig carriers 95, a laser distribution system, a power distribution system, a utility supply system, and a control station $C_n$ furnished with a line console $C_{n1}$, a laser welding NC (numerical control) controller $C_{n2}$, a jig position controller $C_{n3}$, robot controllers $C_{n4}$, laser sources $C_{n5}$, power supplies or distributors $C_{n6}$, and argon sources $C_{n7}$. It is noted that partial lines of the laser and power distribution systems and utility supply system, as well as access routes thereto, are installed over or through an overhead frame system extending over, below and/or around the overhead frame 179.

Figure 1:
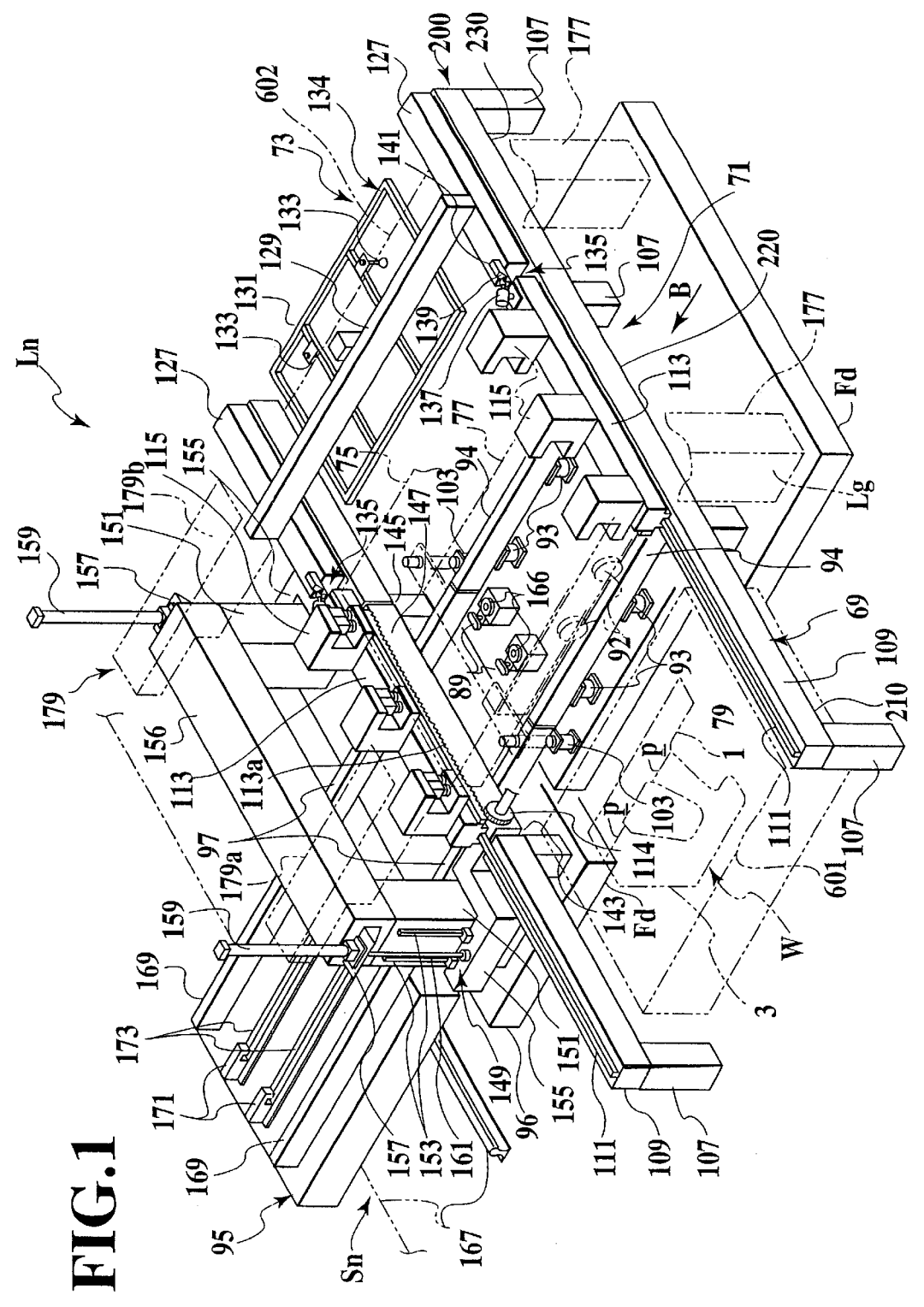
Figure 2:
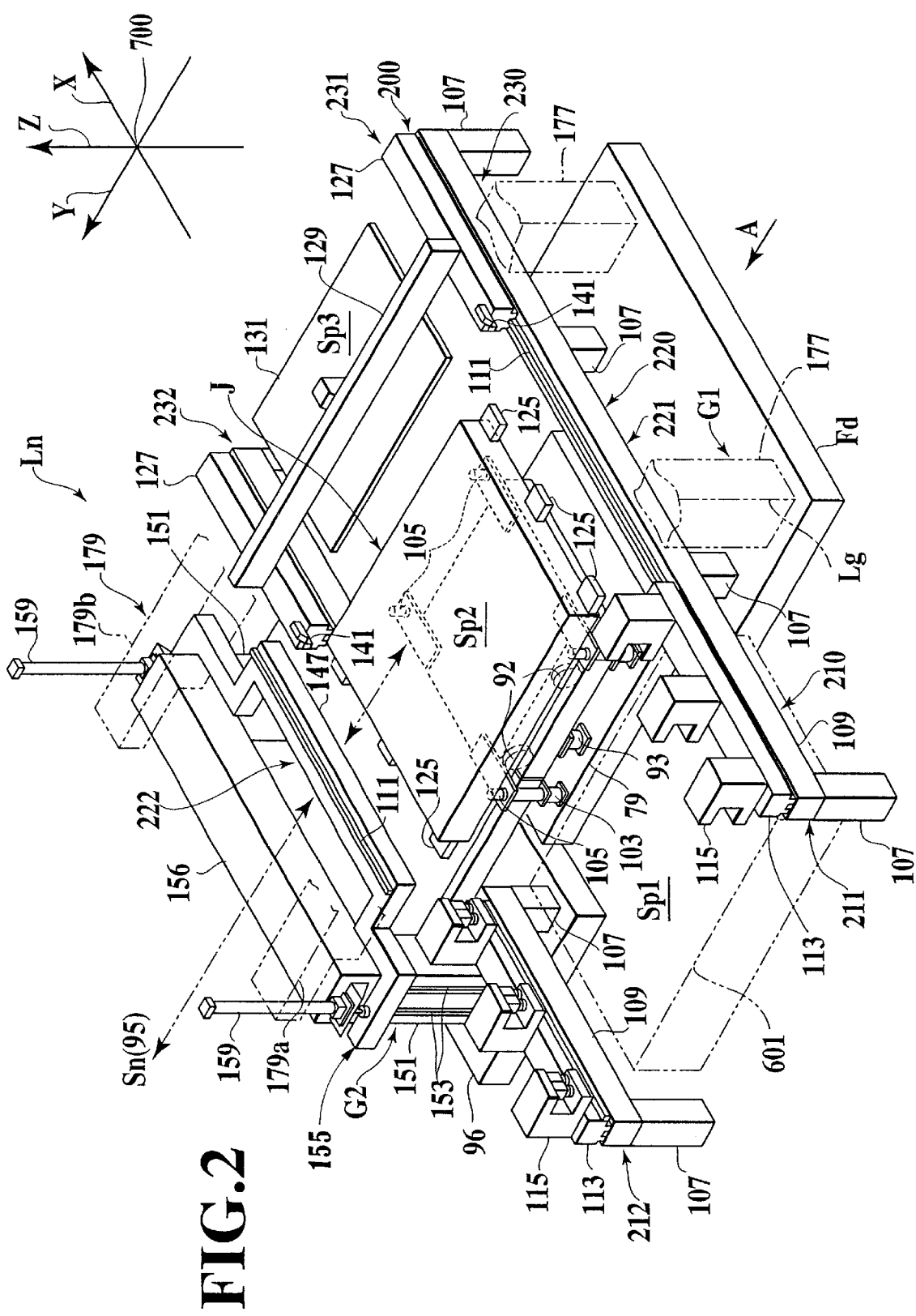
FIG. 2 is a schematic perspective view of an essential portion of the butt welding line section of FIG. 1, with a work handling gateway having a segment thereof lifted for transfer of a combination jig comprising an upper jig and a lower jig.
Figure 3:
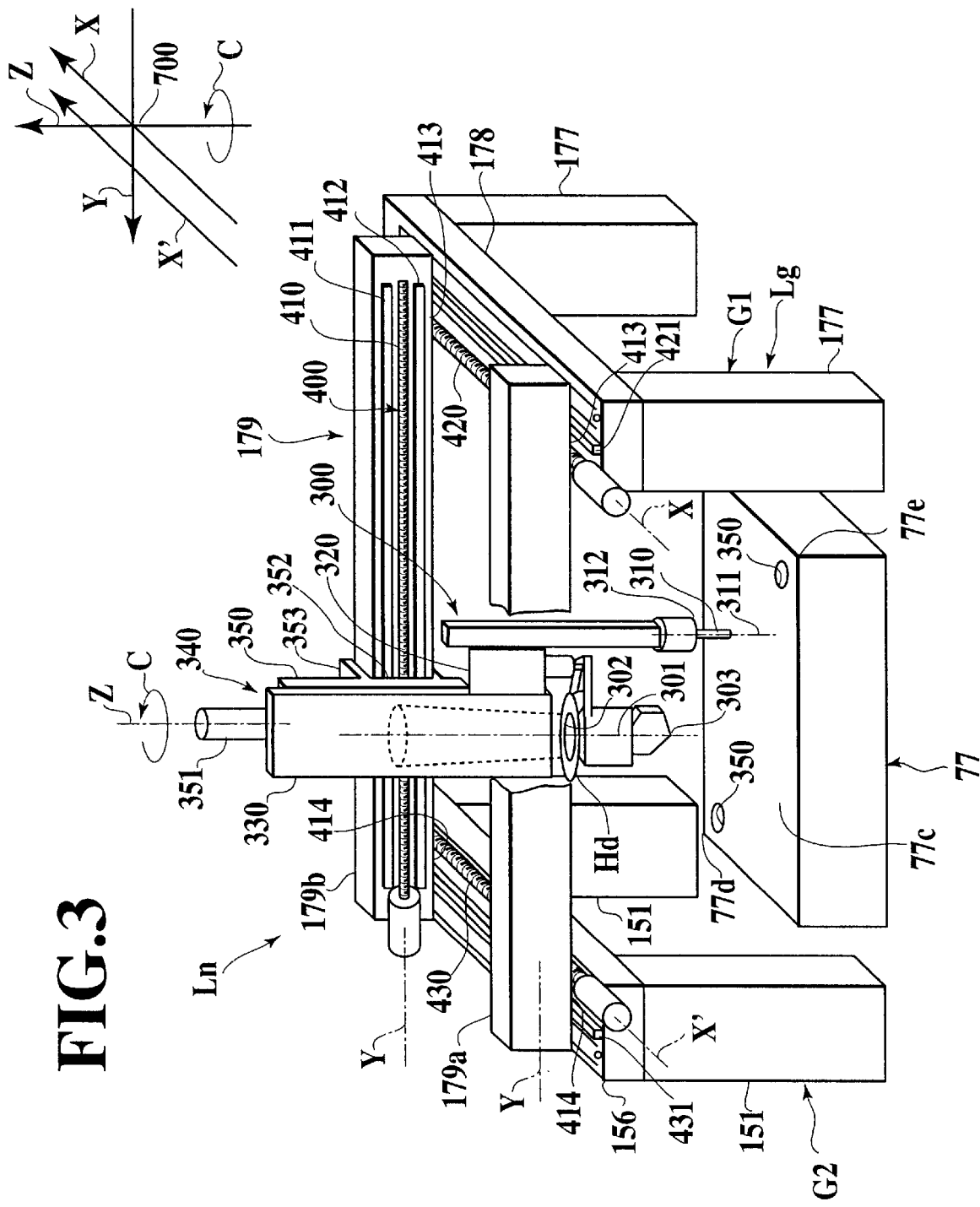
FIG. 3 is a schematic perspective view, partly broken, of an essential portion of a laser head handling gate standing astride the work handling gateway of FIG. 2.
Figure 5:
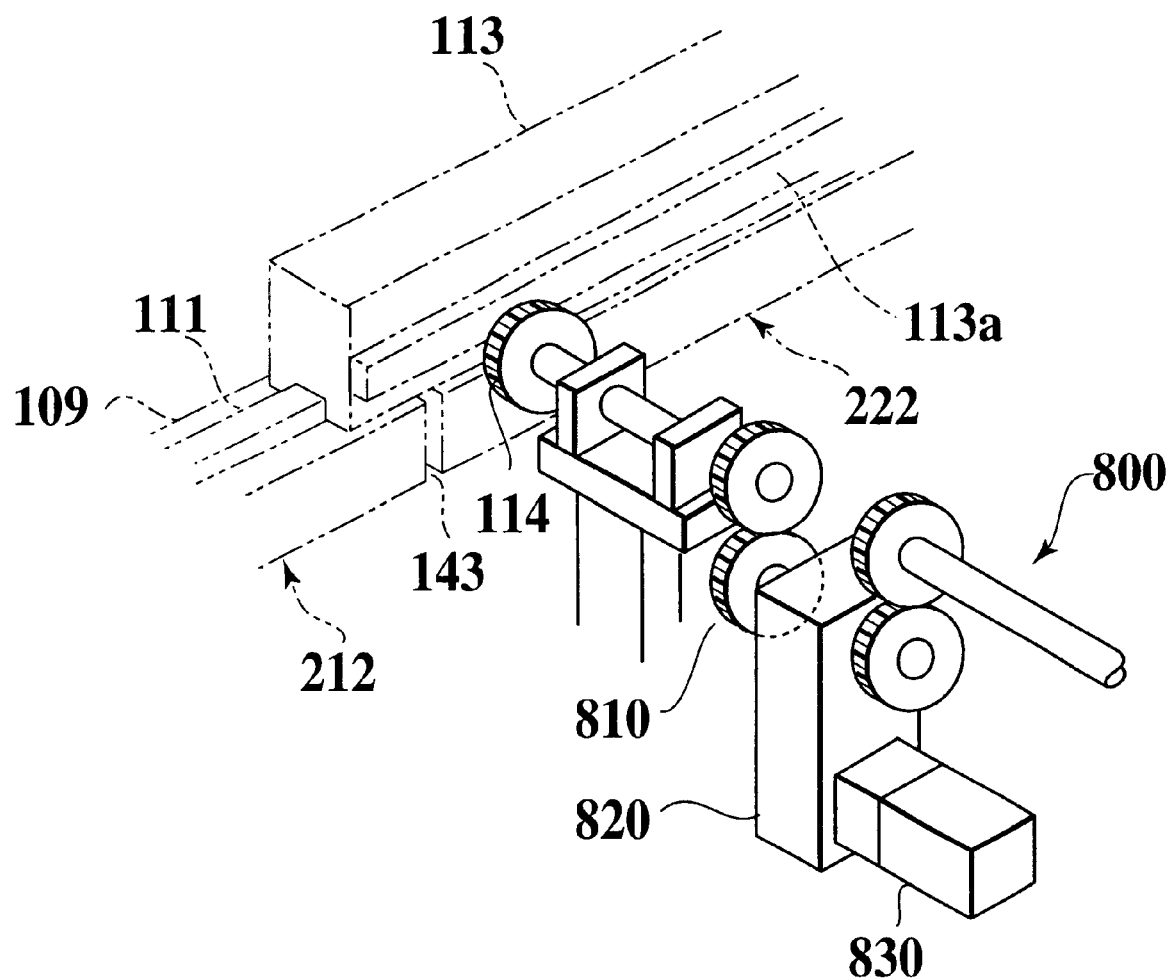
FIG. 5 is a detailed perspective view of a pinion drive of the gateway of FIG. 2.
Figure 6:
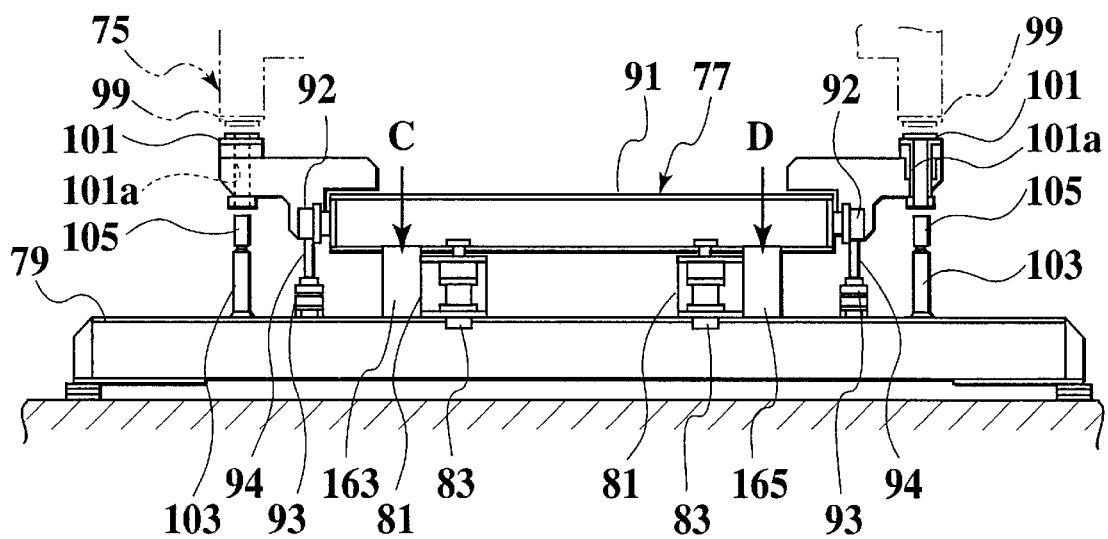
FIG. 6 is a front view of the lower jig on the base, in a direction B of FIG. 1.
Figure 7:
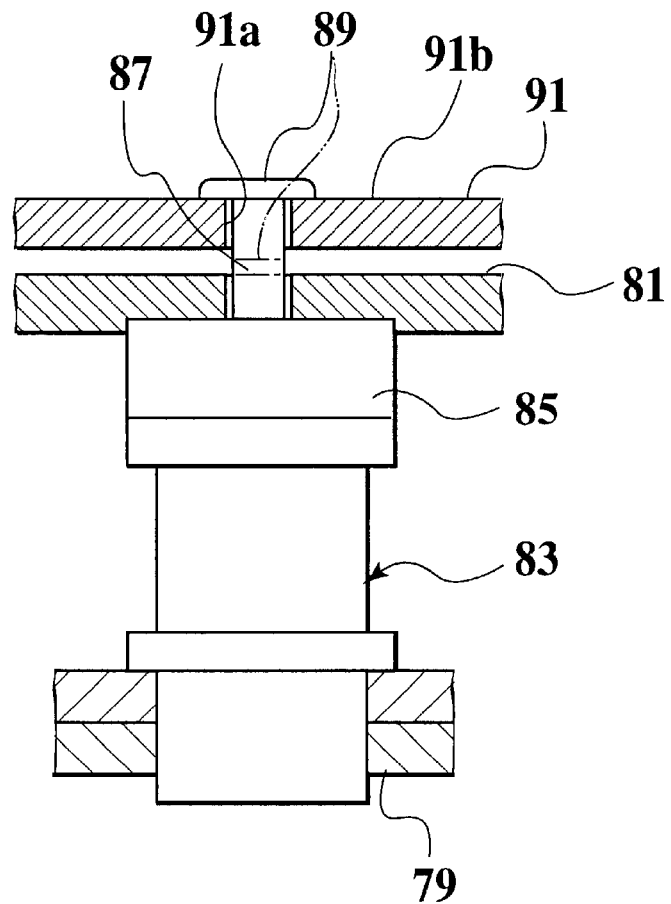
FIG. 7 is a section of a clamp of the lower jig of FIG. 6.
Figure 8:
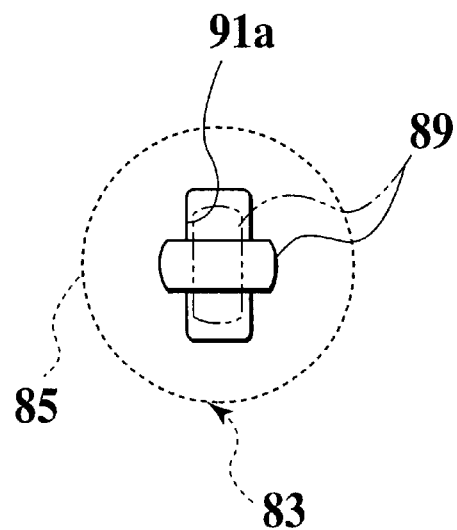
FIG. 8 is a plan of part of the clamp of FIG. 7.

FIG. 1 shows a detailed arrangement of the butt welding line section $L_n$ including a jig replacement apparatus according to an embodiment of the invention; FIG. 2, a lifted segment 222 of the gateway 200 for transfer of an arbitrary one J of different combination jigs that comprises an upper jig 75 and a lower jig 77; FIG. 3, a structure of the laser head feed system 400, a processing head Hd, and a jig position detector 300; FIG. 4, the combination jig J installed on a stationary base 79, as a view in a direction A of FIG. 2; FIG. 5, a pinion drive of the gateway of FIG. 2; FIG. 6, the lower jig 77 on the base 79, as a view in a direction B of FIG. 1; FIG. 7, a clamp of the lower jig of FIG. 6; FIG. 8, part of the clamp of FIG. 7; and FIG. 9, a rail line RL associated with the lower jig 77 and the base 79.

As shown in FIGS. 1 and 2, the gateway 200 comprises a substantially straight file of rectangular gateway sections (210, 220, 230) standing each on foots at its four corners and integrated or separated between every neighboring two of them, as necessary, and includes a left gateway section 210 which is constituted with a first front gateway segment 211 and a first rear gateway segment 212 standing alone, a central gateway section 220 which is constituted with a second front gateway segment 221 integrated with the first front gateway segment 211 and a second rear gateway segment 222 (as the lifted segment in FIG. 2), and a right gateway section 230 which is constituted with a third front gateway segment 231 integrated with the second front gateway segment 221 and a third rear gateway segment 232 standing alone.

The front and rear segments 211, 212; 231, 231 of the first and third gateway sections 210, 230 are interconnected by cross beams, e.g. a beam serving as a support rod 129 of a work support frame 131, securing necessary spaces for jig and work handling and welding operations to be free of interference.

As shown in FIG. 2, the work loading section 69 has a work loading region Sp1 defined between the first front and rear gateway segments 211, 212, where a variety of sets of work pieces (1, 3) of designed works W are loaded one by one in a desirable layout pattern by a work loading robot $R_{n+1}$, the laser welding section 71 has a work processing region Sp2 defined between the second front and rear gateway segments 221, 222, where a programmed butt welding is performed along weld lines P of a respective current set of work pieces (1, 3) to produce a corresponding work W by one or more laser processing heads Hd, and the work unloading section 73 has a work unloading region Sp3 defined between the third front and rear gateway segments 231, 232, where the produced work W is unloaded from the support frame 131 to a work unloading robot $R_{n+3}$.

The three gateway sections 210; 220; 230 as well as the spatial regions Sp1; Sp2; Sp3 between their front and rear segments 211, 212; 221, 222; 231, 232 are continuously arranged in a direction an X-axis of an absolute coordinate system 700 fixed to the butt welding line section $L_n$, as the coordinate system 700 is defined to be recognized at the NC controller $C_{n2}$, (FIG. 17). A selected combination jig J is unloaded from either jig carrier 95 (FIG. 1) at the jig supply station $S_n$ (FIG. 17), and is transferred therefrom along the rail line RL (FIG. 9) in a direction of Y-axis of the absolute coordinate system, through a vertically extended space under the lifted gateway segment 222, into the work processing region Sp2, where it is installed on the base 79 (FIG. 4) so that the lower jig 77 is fixed thereto.

Figure 9:
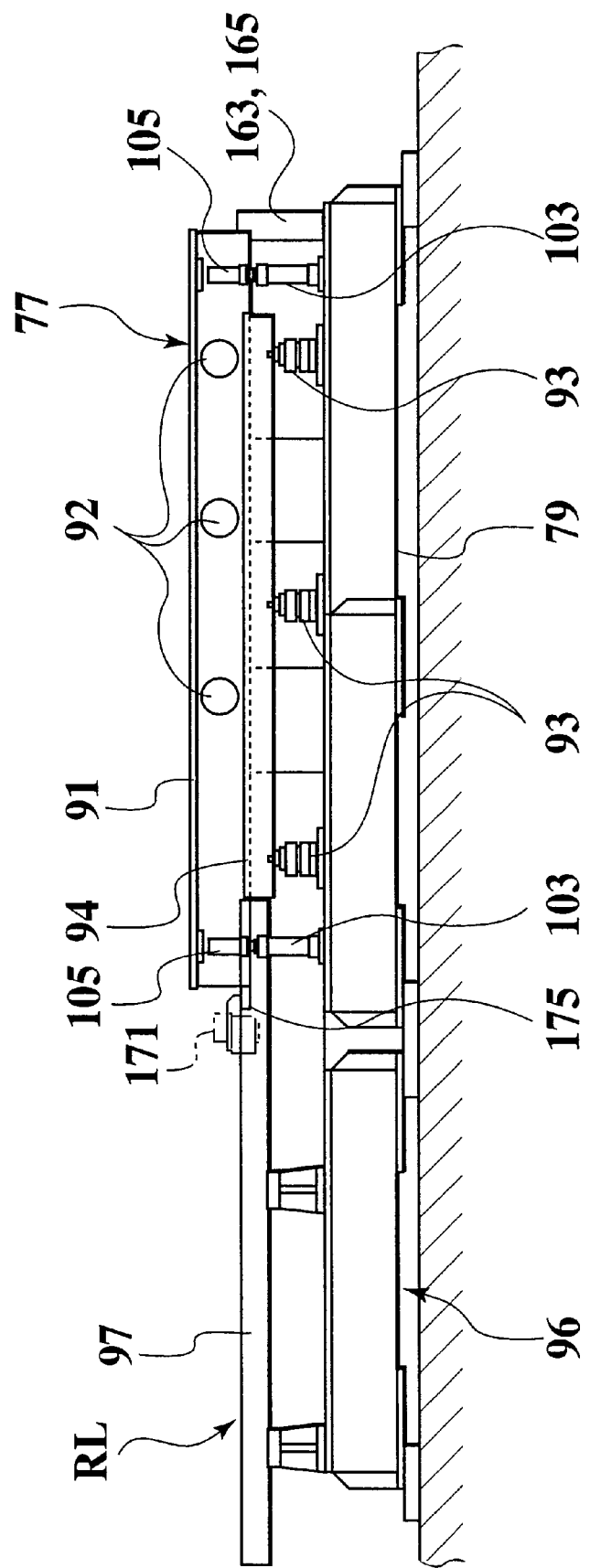
FIG. 9 is a left side view of part of a rail line associated with the base of the lower jig of FIG. 6.

The lower jig 77 has an integrated body frame substantially rectangular in plan composed of an upper body frame 77a of which an upside 77c serves for the butt welding, and a lower body frame 77b to be fixed to the base 79. In FIGS. 6 and 9, the lower jig 77 is illustrated simply by the lower body frame 77b. In the work loading region Sp1, there is installed a work stand 601 as a stationary base for the work pieces (1, 3) to be loaded thereon. The work unloading Sp3 has a work stand 602 (FIG. 1) as a stationary base for the work W to be placed thereon, as necessary. The work stands 601, 602 have their service surface levels flush with the upside 77c of the upper body frame 77a of the lower jig 77 in installed position.

As shown in FIG. 3, installed lower jig 77 is checked for 3D-component-wise positional errors in the absolute coordinate system 700 by detecting real positions of at least one pair of reference holes 350 (FIG. 3) formed in the upside 77c of the upper body frame 77, in vicinities of diagonally opposite corners 77d, 77e. For such detection, each laser processing head Hd is provided with the jig position detector 3 that employs a vertical touch probe 310 to be inserted in the reference holes 350.

The touch probe 310 is fixed via a rigid support member 320 to a rigid body 330 of a laser head carrier 340, which carries the laser processing head Hd in a rotatable manner, so that the probe 310 has a center axis 311 parallel to a center axis 301 of a beam nozzle 302 of the laser head Hd and that a reference end face 312 of the probe 310 coincides in level with a projecting reference end 303 of the head Hd.

The body 330 of the head carrier 340 is supported by a unitized combination of a head support 350 and a ball screw 351 engaged with a step motor, so that the carrier 340 is movable along the ball screw 351 in a direction of Z-axis of the absolute coordinate system 700 and rotatable thereabout to have a defined C-axis position. The head support 350 has a pair of arms 353 slidably engaged with a nearer one of a pair of left and right parallel frame members 179a, 179b of the overhead frame 179, and is driven at a gearing engagement portion 352 thereof to move in the Y-axis direction by a motor-driven ball screw 410 accommodated in a corresponding frame member 179a/179b, and slidably guided by a pair of upper and lower guide rails 411, 412 provided on the frame member.

The left and right frame members 179a, 179b of the overhead frame 179 have their front gearing engagement portions 413 engaged with a motor-driven front ball screw 420 and slidably guided by a front guide rail 421, and rear gearing engagement portions 414 engaged with a motor-driven rear ball screw 430 and slidably guided by a rear guide rail 431. The left frame member 179a as well as associated laser bead Hd is thus driven in the X-axis direction. The right frame member 179b as well as associated laser head Hd is driven in a direction of X'-axis of the coordinate system 700. The front and rear ball screws 420, 430 are controlled in synchronism, so that the X-axis and the X'-axis are kept parallel to each other.

The front ball screw 420 and front guide rail 421 are mounted on a top beam 178 of a front support gate G1 of which left and right leg columns 177 stand on a raised foundation Fd. The rear ball screw 430 and rear guide rail 431 are mounted on a top beam 156 of a rear support gate G2 of which left and right leg columns 151 stand on a stationary base 96. Structural parts of the front and rear gates G1, G2 and the overhead frame 179 constitute a laser gate Lg as a laser head handling framework standing astride the gateway 200.

The lower jig 77 is placed on a plurality of support stands 81 provided on a base 79 in a projecting manner, as shown in FIG. 2 which is a front view seen from arrow B direction in FIG. 1, and each support stand 81 is provided with a lower clamp 83. The lower clamp 83 is provided projectingly with a movable shaft 87 moved upwardly and downwardly by a drive section 85, and the movable shaft 87 is provided at its upper end with a clamping piece 89. A through hole 91a into which the movable shaft 87 is inserted is formed on a main frame 91 of the lower jig 77, and the through hole 91a is formed in an elongated hole extending in upward and downward directions, as shown in FIG. 4 which is a plan view of FIG. 7. The clamp piece 89 is also formed in an elongated shape corresponding to the elongated through hole 91a.

As depicted by double dotted lines in FIG. 8, the movable shaft 87 is downwardly moved with the state where the clamp piece 89 is aligned with the through hole 91a, so that the clamping piece 89 is inserted into the through hole 91a to be lowered down to the vicinity of a position where it contacts with the support stand 81. Then, the movable shaft 87 is upwardly moved so that the clamping piece 89 is moved up to a position above a fixing face 91b of the main frame 91. At this position the clamping piece 89 is rotated 90°, as shown with a solid line in FIG. 4, and it is lowered, so that the clamping piece 89 is brought in close contact with the fixing face 91b, thereby fixing the lower jig 77 to the base 79 side.

A plurality of rollers 92 are provided at left and right side portions of the main frame 91 of the lower jig 77 in FIG. 6. A guide rail 94 for loading and out a jig supported by a plurality of lift means 93 is disposed on the base 79 below the rollers 92 at each side portion, as shown in FIG. 5 which is a left side view of FIG. 6. The guide rail 94 is put in a state where it is separated from the rollers 92 at such a normal time as a work processing time, and at a jig-replacement time the guide rail 94 is upwardly moved in a state where fixation of the lower jig 77 by the clamping piece 89 is canceled, and the lower jig 77 is supported through the rollers 92 by the base 79.

A jig carrier stand 96 is arranged between the base 79 and a jig carrier 95 which is positioned forward and left of the lower jig 77 in FIG. 5 and which is used at a jig-replacement time and will be described later. Carrier stand guide rails 97 are disposed on the jig carrier stand 96 so as to be positioned on extensions of the guide rails 94. An upper face position of each guide rail 94 relative to an upper face position of the corresponding guide rail 97 is set to be positioned such that, when the guide rails 94 are separated from and positioned below the rollers 92, the former upper face is positioned below the latter upper face, and when the lower jig 77 is supported through the rollers 92, the former flushes with the latter, thereby allowing loading and out of the jig.

As shown in FIG. 6, upper jig receivers 101 on which supporting legs 99 disposed at four corners of the upper jig 75 side are seated such that both the jigs 75 and 77 are united with each other are arranged at both left and right sides of the main frame 91 of the lower jig 77. Upper jig lift means 103 are disposed on the base 79 below the upper jig receivers 101. Each upper jig receiver 101 is formed with a rod passing-through hole 101a through which an lift rod 105 passes so as to movable upwardly and downwardly. The lift rod 105 is upwardly moved to project from an upper face of the upper jig receiver 101 so that it can support the supporting leg 99 in a state where the supporting leg 99 is separated from the upper jig receiver 75 above the same.

As shown in FIG. 1, the butt welding line section includes a pair of base frames 109 disposed in parallel with each other and supported by a plurality of studs 107. The base frames 109 are respectively provided with guide rails 111 extending over their whole lengths. Loaders 113 are disposed on the guide rails 111 so as to be movable between the laser welding section 71 and the work loading section 69. Side faces of the left and right loaders 113 opposed to each other are respectively mounted on racks 113a, and the respective racks 113a mesh with pinions 114. As shown in FIG. 5, the pinions 114 are driven to rotate by a gear drive 800 including a gear train 810, a reduction gear 820, and a step motor 830.

Each loader 113 is provided with three upper clamp means 115. Each clamp means 115 is provided with an upper projection 117 and a lower projection 119 serving as a jig receiver, shown with enlargement in FIG. 6, and a cylinder 121 is fixed to a lower face of the upper projection 117. An up-and down-movable piston rod 123 serving as an lift member of the cylinder 121 is moved downward to clamp a flange of the upper jig 75 between the lower projection 119 and the same so that the upper jig 75 is fixed. In a state where the work W is positioned between the upper jig 75 and the lower jig 77, a laser welding processing is effected on the work W.

On the guide rails 111, work unloading loaders 127 are movably disposed between the work unloading section 73 and the laser welding section 71. The work unloading loaders 127 is provided with a supporting frame 131 through a supporting rod 129, and a plurality of vacuum cups 133 holding the welded work W are provided on the supporting frame 131, so that work holding means 134 is configured.

The work unloading loader 127 and the loader 113 can be disconnected from each other by disconnecting means 135. The disconnecting means 135 has a connecting pawl 139 provided at the loader 113 side and driven by a cylinder 137 and a to-be-connected member 141 provided at the work unloading loader 127 side and connected with the connecting pawl 139.

Portions of the base frames 109 and the guide rails 111 corresponding to the laser welding section 71 are divided from the other portions thereof, namely portions corresponding to the work loading section 69 and the work unloading section 73, through boundary portions 143 and 145. A rail divided portion 147 corresponding to the divided laser welding portion 71 is moved upwardly from a position shown in FIG. 1 by an lift means 149 to secure a jig movement range which can be utilized when the jig is carried in and carried out.

The guide rail lift means 149 has a pair of studs 151 provided in a standing manner on a jig conveying stand 96, and each of the studs 151 is provided on its outside face with a pair of rails 153. On the other hand, one ends of supporting arms 155 each bent in a crank shape are fixed to the rail divided portion 147 and the other ends thereof are movable upward and downward regarding the rails 153 of the studs 151.

Also, the respective studs 151 are coupled with each other at their upper ends through a coupling member 156. The coupling member 156 is provided on both outer faces thereof with cylinders 159 through brackets 157, and distal ends (lower ends) of piston rods 161 of the cylinders 159 are fixed to upper faces of the supporting arms 155. That is, the piston rods 153 of the cylinders 159 are retracted (upwardly moved) from the state shown in FIG. 1 so that the rail divided portion 147 united with the supporting arms 155 is upwardly moved.

The up and down movement of the rail divided portion 147 is performed in the state where the loaders 113 is positioned at the work loading section 69, and the rail divided portion 147 is upwardly moved from the state shown in FIG. 1 so that the jig movement range utilized when the jig transfer work is conducted is secured.

Figure 11:
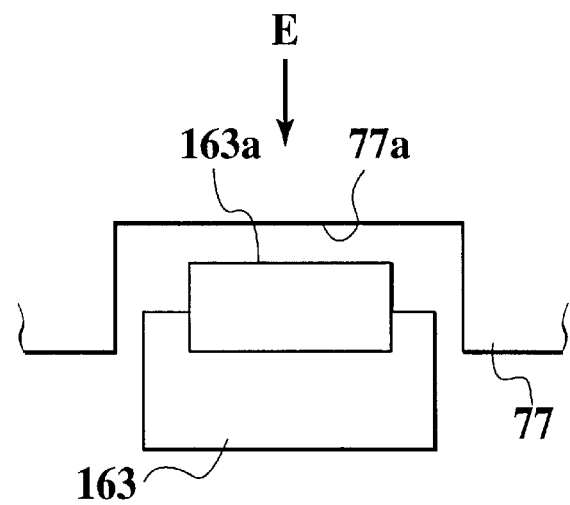
FIG. 11 is a plan of a positioning block in a direction C of FIG. 6.
Figure 12:
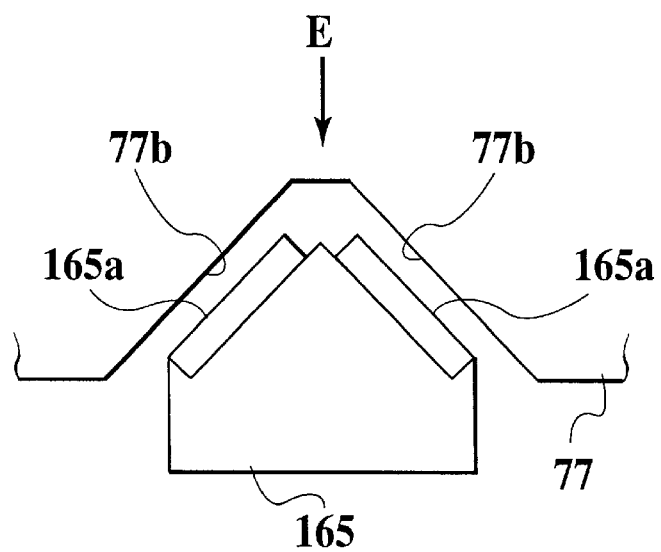
FIG. 12 is a plan of another positioning block in a direction D of FIG. 6.

In order to position the lower jig 77 when a jig is carried from the jig carrier 95 to the laser welding section 71 utilizing the jig movement range, positioning blocks such as shown in FIGS. 11 and 12, are fixed on the base 79. FIG. 11 is a view C of FIG. 6 shown with enlargement and FIG. 12 is an enlarged view D thereof.

The positioning block 163 in FIG. 11 is provided with a face 163a vertical to a loading direction of a jig (in a direction shown with an arrow E in FIGS. 11 and 12), and a face 77a of the lower jig 77 parallel to the vertical face 163a abuts on the vertical face 163a to effect positioning in the loading direction. Namely, the positioning block 163 constitutes loading direction positioning means.

On the other hand, the positioning block 165 shown in FIG. 12 has a pair of left and right inclination faces 165a inclined in direction opposed to each other within a horizontal plane to the jig loading direction, and faces 77b parallel to the inclination faces 165a of the lower jig 77 abut on the inclination faces 165a to conduct positioning in the loading direction. That is, the positioning block 165 constitutes left and right direction positioning means.

Also, lower jig pressing members for pressing the lower jig towards the positioning block 163 and 165 are provided on the base 79 corresponding to end portions of the lower jig 77 opposed to the side where the positioning blocks 163 and 165 are disposed. The lower jig pressing members are movable upward and downward so as to be moved at a position below the lower jig 77 in order to prevent interference with movement of the jig.

Furthermore, when the lower jig 77 is pressed on the positioning blocks 163 and 165, it is maintained in a slightly floated state by a plurality of jig air lifters 166 disposed on the base 79, thereby facilitating pressing work effected by the lower jig pressing members.

The jig carrier 95 shown in FIG. 1 is movable along a pair of carrier guide rails 167 disposed in parallel to the guide rail 111, and another jig carrier is disposed. That is, one of the two jig carriers 95 is moved between a position corresponding to the laser welding section 71 shown in FIG. 1 and a position corresponding to the work loading section 69, and the other is moved between the position corresponding to the laser welding section 71 and a position corresponding to the work unloading section 73. Assuming that the one of the jig carriers 95 is used for loading of the jig, the other is used for unloading thereof.

Jig carrier guide rails 169 as carrier side rails are disposed on the jig carrier 95 so as to is positioned on extension of the carrier guide rails 97 on the jig carrier 96 and in the vicinity of end portion of the carrier guide rails 97 when the jig carrier 95 is positioned at a position corresponding to the laser welding section 71.

Also, jig draw hooks 171 are provided between the pair of carrier guide rails 169 so as to be engageable with the lower jig 77 when the upper jig 75 and the lower jig 77 are carried out from the laser welding section 71 and carried therein and move the engaged lower jig 77 together with the upper jig 75 between the laser welding section 71 and the jig carrier 95.

The jig draw hooks 171 are movable along guide portions 173 disposed in parallel with the carrier guide rails 169 by a driving mechanism, and like guide portions are also provided on the jig conveying stand 96 adjacent to the jig carrier 95. Namely, the jig draw hooks 171 are movable from a position shown in FIG. 1 up to a position near the lower jig 77 disposed on the laser welding section 71 and, as shown in FIG. 5, they can be removably engaged with engagement portions 175 provided at end portions of the lower jig 77.

A laser welder for conducting butt welding of the work W (between the lower panel 1 and the upper panel 3) is supported by laser frame legs 177 shown with a double dotted line in FIG. 1 and a laser frame 179 disposed on the coupling member 156 on the guide rail lift means 149, and a laser processing head Hd moves in the same direction as that of the guide rail 111 and in a direction perpendicular to the guide rail 111 within a horizontal plane to conduct butt welding on the work W on the basis of X-Y coordinate values obtained by an NC processing apparatus within the horizontal plane.

Also, a position detecting device serving as position detecting means for detecting predetermined positions to be detected at four corners of the lower jig 77 positioned and fixed is provided integrally on the laser processing head. When there is a difference between values detected by the position detecting device and defined position data, correcting means for correcting the NC coordinate values of processing position for the work W so as to correspond to the difference is provided on the laser processing head.

It is now assumed for simplification that two laser processing heads Hd are moved and operated independently from each other and two positions to be detected are detected by each laser processing head.

Figure 10:
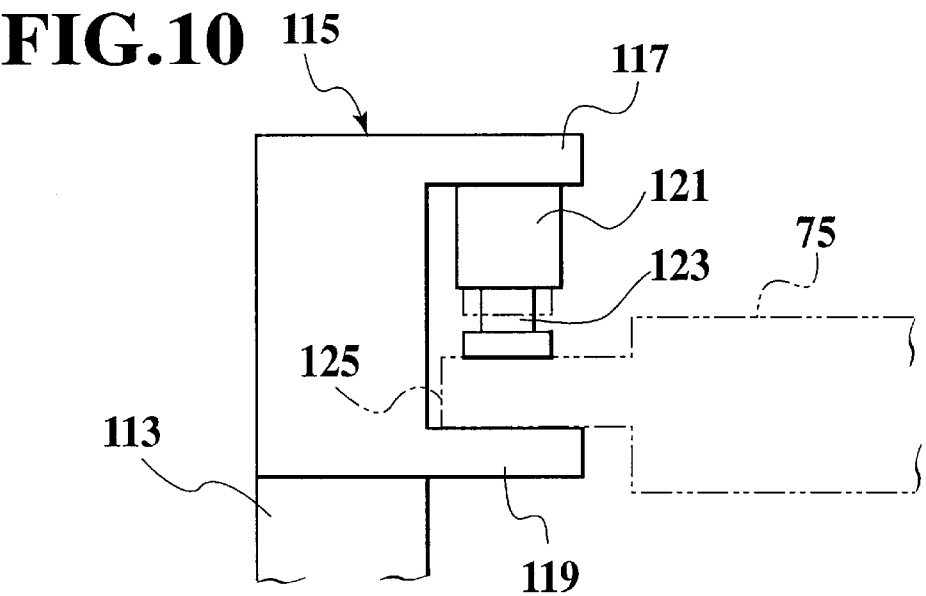
FIG. 10 is a side view of a clamp of the upper jig.

When butt welding is performed on the work W by the above butt welding line section, the lower jig 77 put in a positioned state by the positioning blocks 163 and 165 is fixed by the lower jig clamp 83. On the other hand, the upper jig 75 is held and fixed such that the flange 125 is put on the lower projection 119 of the upper jig clamp means 115 and pressed by the piston rod 123, as shown in FIG. 10. At this time, as shown in FIG. 6, the upper jig 75 is put in a state where the supporting legs 99 are apart from the upper receivers 101.

Figure 4:
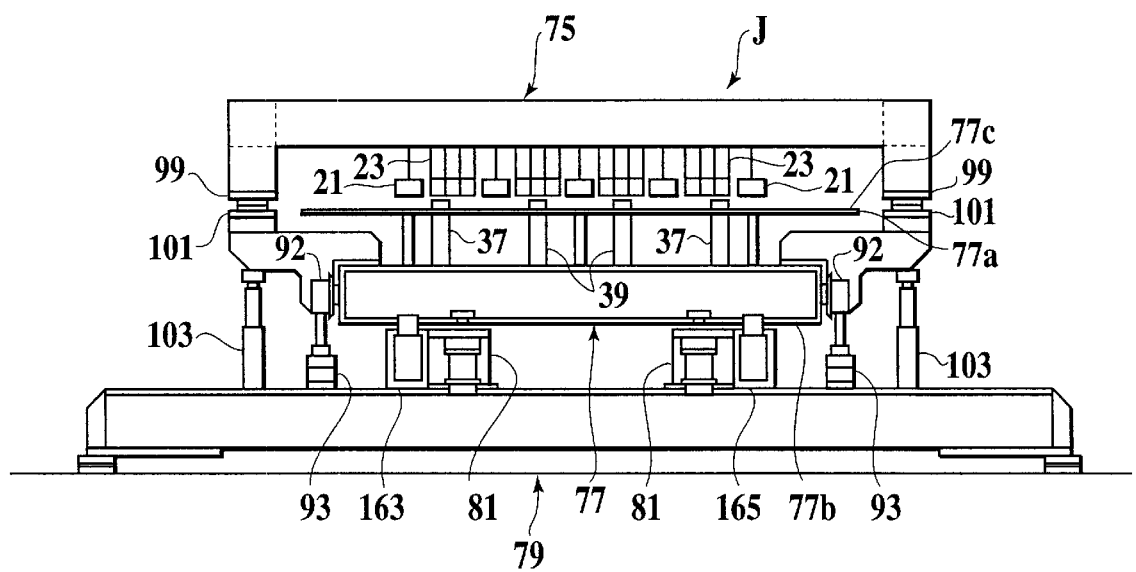
FIG. 4 is a front view of the combination jig in a direction A of FIG.2.

In this state, the loaders 113 are moved on the guide rails 111 together with the work unloading loaders 127 coupled thereto by the coupling/releasing means 135 so that the work W is moved to the laser welding section 71 while it is held by electromagnets 21 shown in FIG. 4. After the work W is positioned by the positioning mechanism, it is butt-welded and the work W welded is sucked by the vacuum cups 133 to be moved to the work unloading section 73.

Next, replacement work of the upper jig 75 and the lower jig 77 used for the butt welding and provided with the positioning mechanism for positioning the work W will be explained. A clamping fixation of the upper jig 75 effected by the upper jig clamp means 115 is cancelled by ascending the piston rods 123 shown in FIG. 10 from the state shown in FIG. 1 where butting work is effected on the work W. With the ascending of the piston rods 123, an ascending region for the upper jig 75 is secured.

In this state, the lift rods 105 of the upper jig lift means 103 shown in FIG. 6 are upwardly moved through the through holes 101a to ascend the supporting legs 99 so that the upper jig 75 is upwardly moved away from the lower projection 119 of the upper jig clamp means 115. Thereby, the upper jig clamp means 115 is put in a state where it has been completely released from clamping operation on the upper jig 75.

Next, the left and right loaders 113 provided with the upper jig clamp means 115 are released from the coupling with the work unloading loaders 127 to be moved up to the work loading section 69. The movement of the loaders 113 is performed up to a position where the base frames 109 and the guide rails 111 are separated from the rail dividing portions 147 divided at portions corresponding to the laser welding section 71.

In a state where the loaders 113 are retracted to the work loading section 69 together with the upper jig clamp means 115, the lift rods 105 of the upper lifters 103 shown in FIG. 6 are downwardly moved to place the supporting legs 99 of the upper jig 75 on the upper jig receivers 101 of the lower jig 77, thereby joining the lower jig 75 and the upper jig 77 together.

Next, clamping the lower jig 77 by the lower jig clamps 83 shown in FIG. 7 is canceled and lower jig pressing means for pressing the lower jig 77 towards the positioning blocks 163 and 165 is also lowered down to a position where it does not interfere with the lower jig 77.

In this state, the jig transfer guide rails 94 are upwardly moved so as to be almost flush with the carrier guide rails 97 on the jig carrier 96. At this time, the jig transfer guide rails 94 support the lower jig 77 via the rollers 92.

Next, the cylinders 159 of the guide rail lift means 149 are actuated to ascend the piston rods 161. The rail divided portions 147 are upwardly moved by the ascend of the supporting arms 155 following the ascend of the piston rods 161. Thereby, a movement range for carrying the upper jig 75 and the lower jig 77 out to the jig carrier 96 side is secured.

In this state, the jig draw hooks 171 of the jig carrier 95 shown in FIG. 1 are advanced to be engaged with the engagement portions 175 of the lower jig 77, as shown in FIG. 9. After the engagement, the jig draw hooks 171 are retracted so that the rollers 92 of the lower jig 77 move on the carrier guide rails 97 on the jig carrier 96 from the jig transfer rails 94 while they are rotating, and move on the carrier guide rails 169 on the jig carrier 95. Thus, the upper jig 75 and the lower jig 77 joined together are carried out on the jig carrier 95.

Next, the jig carrier 95 carrying the upper jig 75 and the lower jig 77 carried out is moved, for example, to a position corresponding to the work loading section 69 along the carrier guide rails 167. Another jig carrier 95 is positioned at a position corresponding to the work loading section 73 and another upper jig and another lower jig provided with positioning mechanism having a structure where a mutual welding line of plate materials to be but-welded is different from that of the welding lines of the jigs which have been carried out are placed on the another jig carrier.

The another jig carrier is moved from the position corresponding to the work unloading section 73 to the position corresponding to the laser welding section 71. The another lower jig of the jigs on the another jig carrier is engaged with hooks similar to the jig draw hooks 171 like the jigs which have been carried out. Accordingly, the hooks are advanced reversely to the loading operation so that new or the other jigs are carried in the laser welding section 71.

After the other jigs are carried in, the above hooks are disengaged from the lower jig to be retracted, and then the jig transfer guide rails 94 are lowered, so that supporting the lower jig 77 by these rails 94 is canceled and the jig air lifters 166 are actuated, thereby slightly float the lower jig along with the upper jig from the support stand 81 by air.

In the state where the lower jig is slightly floated, after lower jig pressing means is upwardly moved, the lower jig is pressed against the positioning blocks 163 and 165 shown in FIGS. 11 and 12 by the lower jig pressing means, thereby positioning the lower jig in the jig loading direction and in the left and right directions regarding the jig loading direction. After the positioning, the actuation of the jig air lifters 166 is stopped and the lower jig is clamping-fixed by the lower clamps 83 shown in FIGS. 7 and 8.

Next, the lift rods 105 of the upper lift means 103 are upwardly moved so that the upper jig is upwardly moved so as to separate the supporting legs 99 from the upper jig receivers 101. The rail divided portions 147 are downwardly moved by the guide rail lift means 149 to be put in the state shown in FIG. 6.

In this state, the loaders 113 which have been retracted in the work loading section 69 are moved to the laser welding section 71. By this movement the upper jig clamp means 115 on the loaders 113 are also moved to the laser welding section 71, so that the flange 125 of the upper jig 75 shown in FIG. 6 is inserted in between the lower projection 119 and the piston rod 123 of each upper jig clamp means 115. At this time, the flange 125 of the upper jig 123 is put in a state where it is separated from the lower projection 119. Here, the loaders 113 are joined to the work loading loaders 127 by the coupling/releasing means 135.

Next, the lift rods 105 of the upper jig lift means 103 are downwardly moved, and the upper jig 75 is put in a state where the flange 125 is placed on the lower projection 119 of each upper clamp means 115 to be held by the upper jig clamp means 115, as shown in FIG. 10. In this state, the cylinder 121 of the upper jig clamp means 115 is actuated to descend the piston rod 123, so that the lower jig 75 is clamping-fixed between the piston rod 123 and the lower projection 125. Thus, new jigs are mounted on the butt welding line section.

As described above, in the butt welding line section, as the jigs are replaced by the jig replacement apparatus, a welding line position can be changed when mutual butt welding is performed on plate materials. Accordingly, for example, the butt welding line section is also applicable to a case where an outer panel of a door is divided into three pieces or four pieces and the butt welding is effected on these pieces, and it has very high applicability as a laser welding processing equipment.

New jigs are positioned on the base 79 with a considerably high accuracy. However, the butt welding line section has a correcting means as means for a case where there occurs a slight positional difference and correction of the positional accuracy is made by the correcting means. Control flow for the correction is shown in FIGS. 13, 15 and 16, and a theoretical concept of the correction is illustrated in FIG. 14.

Figure 13:
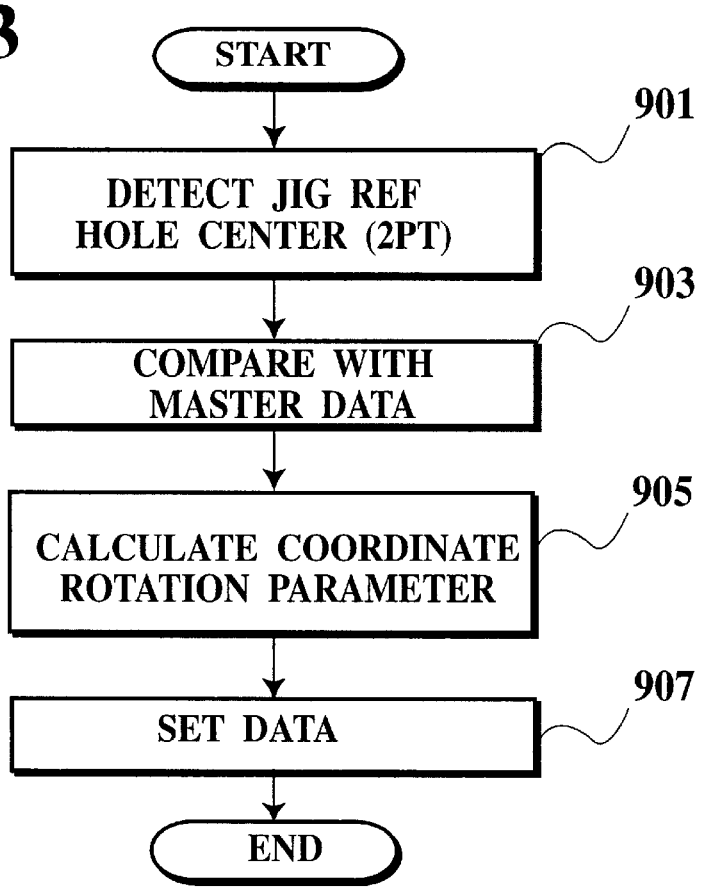
FIG. 13 is a flowchart of control actions a controller for correcting of a position of the lower jig.
Figure 14:
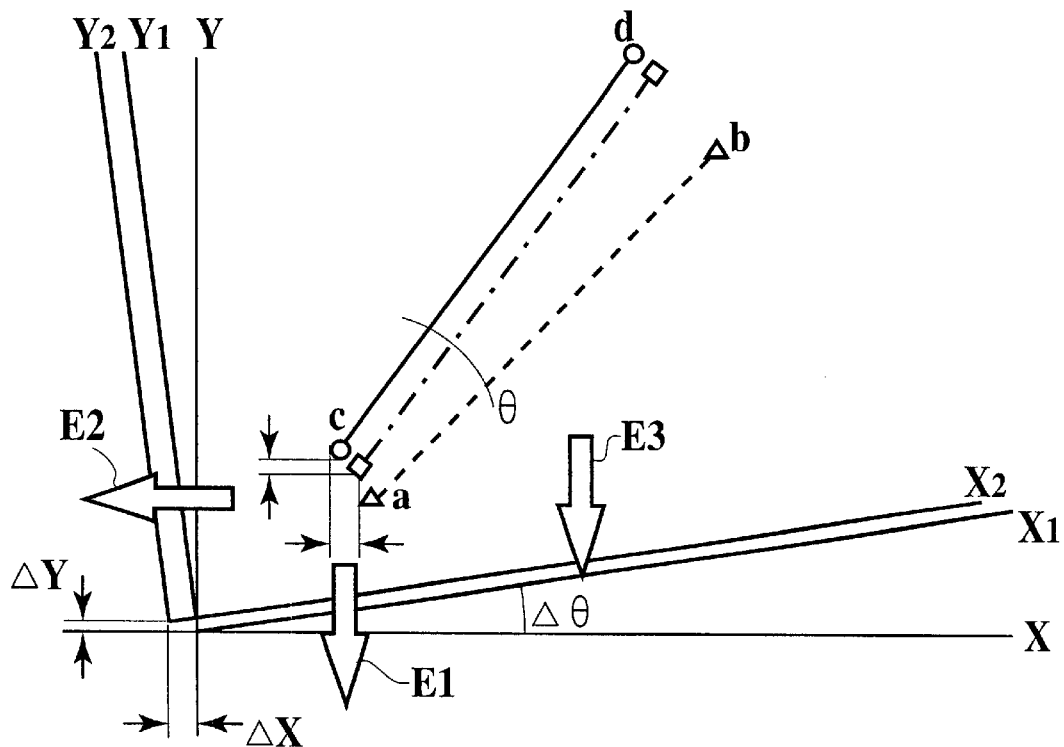
FIG. 14 is a diagram describing control actions of the controller.

At a time of jig replacement, as shown in FIG.13, the two holes 350 as reference positions on a lower jig 77 are detected by the detectors 300 of two laser processing heads Hd (step 901). Then, as illustrated by FIG. 14,the detected values (as a vector d-c with components [X2, Y2]) are compared with master data (as a vector b-a with components [X1, Y1]) (step 903), which have been detected as initial data and stored in a memory of the control station. Coordinate rotation parameters of X, Y, θ in the NC controller are calculated in consideration of differences $\Delta X(=X2-X1)$, $\Delta Y(=Y2-Y1)$, $\Delta\theta$ (=arctangent $\Delta Y/\Delta X$) between the detected values and the master data, as errors E1, E2, E3 of a current spatial position in the absolute coordinate system 700 relative to a reference position therein based on the master data (step 905), and resultant data E, E2, E3 are set in the NC controller (step 907), thereby to correct the position.

Figure 15:
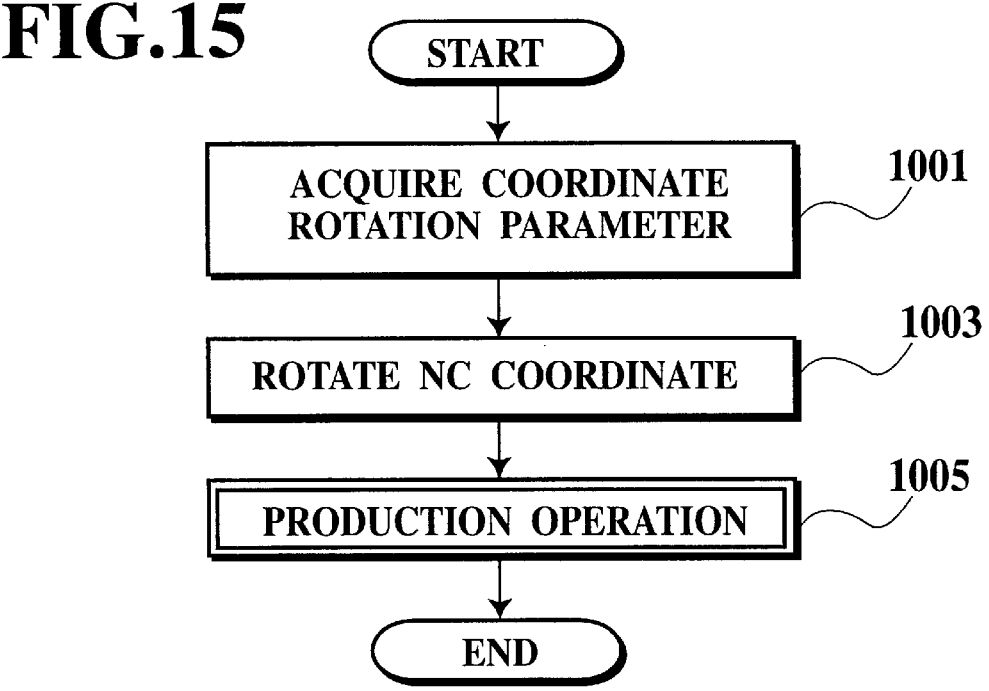
FIG. 15 is a flowchart of control actions of a laser welding controller.

FIG. 15 is a control operation effected when a laser welding is conducted after the positioning is corrected. That is, after the coordinate rotation parameters obtained in the processes of FIG. 13 are acquired (step 1001), the coordinate system 700 in the NC controller is displaced and rotated by E1, E2 and E3 (step 1003), and production operation, i.e. laser welding is performed (step 1005).

Figure 16:
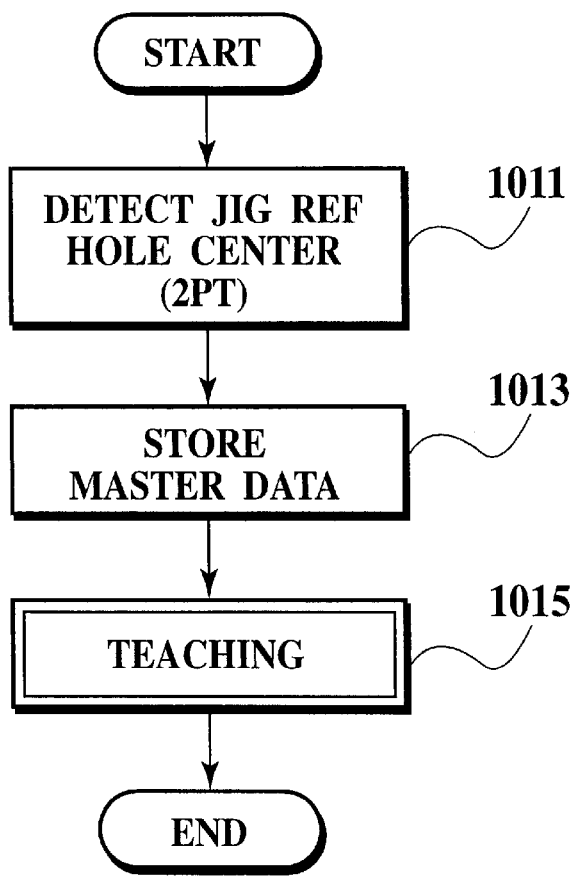
FIG. 16 is a flowchart of teaching actions of the laser welding controller.

FIG. 16 shows a teaching operation of the master data in FIG. 13. First, after the predetermined positions of holes 350 on the lower jig 77 are detected by the two position detecting devices (step 1011), the detected master data serving as the reference is stored (step 1013) and the process proceeds to the teaching operation (step 1015).

Accordingly, even errors due to mechanical deformations and backlashes in the laser head feed system 400 are removed in a canceling manner.

In the embodiment, a jig replacement apparatus is provided for replacement of an upper jig and a lower jig, which is provided with the lower jig disposed on a base and the upper jig for holding and fixing a work in cooperation with the lower jig for effecting a predetermined processing on the work, the upper jig being movable along a guide rail between a work processing position where the work is machined and a work loading position where the work is carried in externally and being capable of holding the work, the apparatus comprising: a loader moving on the guide rail; upper jig clamp means disposed on the loader, and provided with a jig receiver on which a side edge of the upper jig is placed and a lift member descending above the jig receiver to clamp fixing the side edge of the upper jig between the same and the jig receiver; upper jig lift means putting the loader in a state where the loader together with the upper jig clamp means is movable to the work loading position; a jig transfer guide rail guiding the upper jig and the lower jig joined together in a state where the loader together with the upper jig clamp means is moved to the work loading position and the upper jig is downwardly moved by the upper jig lift means to be placed on the lower jig so that both the jigs are joined together so as to be moved in a direction perpendicular to the guide rail, the jig unloading and unloading guide rail being positioned below the lower jig to be separated from the lower jig at an ordinary time; rail lift means ascending the jig transfer guide rail so as to support the lower jig joined together the upper jig; and guide rail lift means moving the guide rail so as to secure a movement range for both the jigs when the lower jig together with the upper jig is moved along the jig transfer guide rail which has been upwardly moved to be carried out externally or carried in externally.

According to a jig replacement apparatus thus configured, after an upper jig is floated from a jig receiver of upper jig clamp means by upper jig lift means in a state where a clamp-fixation of the upper jig by the upper jig clamp means is canceled, a loader together with the upper jig clamp means is moved to a work loading position. Here, the upper jig is downwardly moved by the upper jig lift means to be placed on a lower jig, a jig transfer guide rail is upwardly moved to support the lower jig together with the upper jig, and further the guide rail is moved up to a position out of a movement range for jig positioned along the jig transfer guide rail. In this state, the upper jig and the lower jig joined together is carried out along the jig transfer guide rail externally. After the jigs are carried out, other jigs are carried in by operations reverse to the above order.

Accordingly, the replacement of the upper jig and the lower jig for clamping and fixing a work is made possible, thereby improving an applicability of a processing equipment.

The upper jig and the lower jig are provided with positioning mechanisms for positioning respective plate materials along a defined welding line when butt welding is performed on the plate materials.

An upper jig and a lower jig are changed, thereby making it possible to change a welding line position when mutual butt welding is performed on plate materials.

Accordingly, the upper jig and the lower jig are replaced so that the change of the welding line position is made possible when mutual butt welding is performed on the plate materials, which results in improvement in an applicability as a weld processing equipment.

The upper jig lift means is disposed below the lower jig and ascends the upper jig through the lower jig.

An upper jig lift means ascends an upper jig through a lower jig from below the lower jig upwardly, thereby putting a loader in a state where the loader is movable to a work loading position.

Since the upper jig lift means ascends the upper jig through the lower jig below the lower jig, it is unnecessary to project the upper jig from the outer peripheral portion of the lower jig outwardly so as to prevent the upper jig lift means from interfering with the lower jig, so that a large scaling of the upper jig can be avoided.

A lower jig is provided with a roller rotationally moved on a jig transfer guide rail. A lower jig joined together an upper jig is smoothly moved on a jig transfer guide rail by a roller.

Since the lower jig is provided with the roller rotationally moved on a jig transfer guide rail, the lower jig joined together the upper jig can smoothly be moved on the jig transfer guide rail.

The guide rail is divided into a portion corresponding to the work processing section and a portion corresponding to the work loading position, and the rail divided portion corresponding to the work processing portion is movable to a position out of a movement range utilized when the jigs are carried out or in.

In a state where a loader together with upper jig clamp means has been moved to a work loading position, a rail divided portion of a guide rail corresponding to the work processing (welding) position is moved so that a movement range for jig is secured when jigs are carried out and in.

As the rail divided portion of the guide rail corresponding to the work processing position is moved in the state the loader together with the upper jig clamp means has been moved to the work loading position, the movement range utilizing when the jigs are carried out and in can be secured.

A jig carrier is provided ahead of the jigs carried out externally in the unloading direction, the jig carrier is provided with a carrier side guide rail on which a roller provided on the lower jig is rotationally moved and a jig draw hook releasably engaged with the jig for moving the jig engaged with the hook between the work processing position and the jig carrier.

In a state where a rail divided portion of a guide rail corresponding to a work processing position has been moved so as to be out of a movement range utilized when jigs are carried out and in, a jig draw hook on a jig carrier is engaged with the jig at the work processing position and in the engaged state the jig draw hook is retracted so that the jigs are carried out on the jig carrier.

The carrying work of the jigs regarding the work processing position can easily be performed using the jig carrier.

The jig carrier is movable in a direction perpendicular to the jig transfer guide rail, and another jig carrier is provided, where one of the jig carriers is moved to the work loading position side and the other is moved to a side opposed to the loading position side.

When jigs positioned at a work processing position is carried out to one jig carrier positioned at a side position of the work processing position, the one jig carrier is moved in a direction perpendicular to a guide rail, for example to a work loading position side. Another jig is placed on the other jig carrier, and the other jig carrier is moved to the work processing position side where the other jig is carried in the work processing position. Since two jig carriers on which different jigs are placed are used, the change of the jigs can easily be performed.

The guide rail is extended to the work unloading position opposed to the work loading position about the work processing position, and work holding means movable between the work unloading position, the work loading position along the guide rail is provided for conveying the work machined at the work processing position up to the work unloading position, and coupling/releasing means which can release the coupling of the work holding means and the loader is provided between the work holding means and the loader. At a time of jig replacement, work holding means and a loader are put in a state released from each other by coupling/releasing means, so that, when the loader together with an upper jig clamp means is moved to a work loading position, the work holding means can stand by at the work unloading position. When a work held and fixed by jigs at a work processing position is machined or welded, the work holding means and the loader are put in a state coupled to each other by the coupling/releasing means. Thereby, an upper jig and the work holding means joined together are moved on a guide rail At the jig replacement, the work holding means and the loader are put in the released state by the coupling/releasing means, so that the loader together with the upper jig clamp means can be moved to the work loading position while the work holding means remains at the work unloading position.

A positioning block against which a lower jig abuts to be positioned is provided ahead of a jig loading direction to a work processing position, and the positioning block is constituted with a jig loading direction positioning portion having a face vertical to a jig loading direction and left and right directions positioning portion having a pair of left and right inclination faces inclined in reverse directions regarding the jig loading direction positioning portion within a horizontal plane.

A lower jig joined with an upper jig is positioned regarding a jig loading direction by a jig loading direction positioning portion of a positioning block, and it is positioned regarding left and right directions to the jig loading direction by left and right directions positioning portion of the block.

The lower jig joined with the upper jig is positioned regarding the jig loading direction and the left and right directions by a positioning block constituted with a jig loading direction positioning portion and left and right directions positioning portion.

Position detecting means for detecting a predetermined position to be detected of the lower jig positioned by the positioning block and correcting means for correcting a coordinate of processing position to the work so as to correspond to a difference or deviation between the value detected by the position detecting means and a predetermined defined position data when there is the difference are provided.

When a predetermined position to be detected of a lower jig is detected by position detecting means and there is a difference between the value detected by the position detecting means and a defined position data, the coordinate of a processing position to a work is corrected so as to correspond to an amount of the difference.

Even when the lower jig which has been positioned by the positioning block is deviated form a defined position, a coordinate of a processing position to a work is corrected by an amount corresponding to the deviation, so that a processing accuracy is maintained in a desired range.

In a case where an upper jig and a lower jig are provided with positioning mechanisms for positioning respective plate materials such that the plate materials can be welded along a defined welding line when mutual butt welding is performed on the plate materials, it is made possible to change a welding line position by replacement jigs, which results in improvement in an applicability as a processing equipment.

The upper jig and the lower jig for clamping and fixing the work can be replaced, thereby improving an applicability of the processing equipment.

The line section comprises a butt welding line section for work pieces to be fixed in welding positions therein and thereby butt welded to each other to produce a work, the butt welding line section having a first work region for the work pieces to be loaded therein, a second work region for the work pieces to be fixed by the combination jig in the welding positions therein and butt welded therein, a third work region for the work to be unloaded therefrom. The gateway comprises a pair of guide rails extending alongside the first, second and third work regions, at opposite sides thereof in the transverse direction, and the rail line comprises a pair of transfer rails extending in the transverse direction for the combination jig to be transferred therealong to and from the second work region. The selected combination jig comprises an upper jig adapted to be guided along and fixed relative to the pair of guide rails, and a lower jig adapted to be fixed in position in the second work region, and the upper and lower jigs are adapted to be operated to cooperate with each other to hold the work pieces in the welding positions.

The contents of Japanese Patent Application No. 10-192093 are incorporated herein by reference.

While preferred embodiments of the present invention have been described using specific terms, such description is for illustrative purposes, and it is to be understood that changes and variations may be made without departing from the spirit or scope of the following claims.

What is claimed is:

1. A production system comprising:
    an elongate work region for an arbitrary one of different combination jigs to be handled therein to thereby hold a work to be processed;
    a gateway extending along the work region and adapted to longitudinally carry an upper jig portion of the arbitrary combination jig, the gateway having a separable gateway segment separable from a remaining gateway portion of the gateway;
    a rail line traversing a space adjacent to and partially occupied by the separable gateway segment to guide the arbitrary combination jig into and out of the work region transversely to the separable gateway segment when said separable gateway segment is separated from the gateway; and
    a gateway segment lifter configured to lift the separable gateway segment to be separated from the gateway.

2. The production system of claim 1, further comprising a laser head for the work to be thereby processed in the work region.

3. The production system of claim 2, wherein the work comprises work pieces to be butt welded therebetween by the laser head.

4. The production system of claim 3, wherein the arbitrary combination jig comprises:
    a lower jig portion to be fixed in the work region; and
    the upper jig portion cooperative with the lower jig portion to establish positions of the work pieces relative to a butt weld line between the work pieces.

5. The production system of claim 1, further comprising a block set for a lower jig portion of the arbitrary combination jig to abut thereon to be longitudinally and transversely positioned in the work region.

6. The production system of claim 1, comprising:
    the gateway having
        a movable jig clamp configured to clamp the upper jig portion to be carried, and
        a clamp guide configured to guide the movable jig clamp, the clamp guide including a divided guide portion as part of the separable gateway segment;
    a lifting member to lift the upper jig portion of the arbitrary combination jig to be released from the movable jig clamp; and
    a fastening element cooperative with the lifting member to fasten the released upper jig portion to a lower jig portion of the arbitrary combination jig.

7. The production system of claim 1, further comprising:
    a detector to detect a jig position of the arbitrary combination jig; and
    a controller to control a processing of the work in consideration of an error of the jig position.

8. The production system of claim 1, wherein the gateway has:
    a movable jig clamp configured to clamp the upper jig portion to be carried; and
    a clamp guide configured to guide the movable jig clamp, the clamp guide including a divided guide portion as part of the separable gateway segment.

9. The production system of claim 8, wherein the gateway further has:
    an unloader operable to unload the work from the work region the unloader being guided by the clamp guide;
    a drive to drive the movable jig clamp to carry the upper jig portion; and
    a disconnectable coupler interconnecting the unloader and the movable jig clamp.

10. The production system of claim 1, further comprising:
    a laser head feed mechanism extending overhead the gateway to feed a laser head in the work region; and a gate standing astride the rail line to support the gateway segment lifter and the laser head feed mechanism.

11. The production system of claim 1, wherein the arbitrary combination jig is wheeled to travel on the rail line.

12. The production system of claim 1, further comprising a jig supply station to supply a voluntary one of the different combination jigs.

13. The production system of claim 12, wherein the rail line comprises a mobile rail line disposed in the work region, and a stationary rail line disposed between the mobile rail line and the jig supply station.

14. The production system of claim 12, further comprising a drawer to draw the arbitrary combination jig along the rail line.

15. The production system of claim 12, wherein the jig supply station has a pair of jig carriers guided by a rail, one being employed to carry the arbitrary combination jig and the other to carry another combination jig to be replaced with the arbitrary combination jig, the pair of jig carriers being movable in opposite directions.

16. A production system comprising:
    an elongate work region for an arbitrary one of different combination jigs to be handled therein to thereby hold a work to be processed;
    a gateway extending along the work region and adapted to longitudinally carry an upper jig portion of the arbitrary combination jig the gateway having a separable gateway segment separable from a remaining gateway portion of the gateway;
    a rail line traversing a space adjacent to and partially occupied by the separable gateway segment to guide, passing therebelow, the arbitrary combination jig into and out of the work region transversely to the separable gateway segment when said separable gateway segment is separated from the gateway; and
    means for upwardly moving the gateway segment to be separated from the gateway.

17. A production system according to claim 1 including a jig replacement method for replacing the arbitrary combination jig, the jig replacement method comprising the steps of:
    fixing the upper jig portion to a lower jig portion of the arbitrary combination jig,
    moving the separable gateway segment from an original position to an upwardly offset position thereof;
    guiding the lower jig portion out of the work region transversely of the gateway, passing below the separable gateway segment; and
    downwardly moving the separable gateway segment from the upwardly offset position to the original position.

18. A production system according to claim 17, wherein the gateway has;
    a movable jig clamp configured to clamp the upper jig portion to be carried;
    a clamp guide configured to guide the movable jig clamp, the clamp guide including a divided guide portion as part of the separable gateway segment;
    a base disposed in the work region; and
    a stationary jig clamp configured to claim the lower jig portion to be set on the base,
the upper jig portion is adapted to cooperate with the lower jig portion to pinch therebetween the work to be subjected to the processing, and
the rail line comprises
    a movable guide rail extending within the gateway, and
    a stationary guide rail crossing the separable gateway segment, and
wherein
the step of fixing the upper jig portion comprises the steps of:
    upwardly moving the upper jig portion to be released from the movable jig clamp;
    removing the movable jig clamp along the clamp guide; and
the step of guiding the lower jig portion comprises the steps of;
    releasing the lower jig portion from the stationary jig clamp;
    placing the lower jig portion on the movable guide rail, downwardly moving the upper jig to be placed on the lower jig;
    leveling the movable guide rail to the stationary guide rail, with the lower jig portion thereon; and
    guiding the lower jig portion along the stationary guide rail outside the gateway.

* * * * *